(12) United States Patent
de Fresart et al.

(10) Patent No.: US 12,028,013 B2
(45) Date of Patent: Jul. 2, 2024

(54) MOUNTING PIN FOR PHOTOVOLTAIC MODULE MOUNTING SYSTEM

(71) Applicant: ARRAY TECHNOLOGIES, INC., Albuquerque, NM (US)

(72) Inventors: Benjamin de Fresart, Chandler, AZ (US); Thierry Marin-Martinod, Chandler, AZ (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 18/334,265

(22) Filed: Jun. 13, 2023

(65) Prior Publication Data
US 2024/0128920 A1  Apr. 18, 2024

Related U.S. Application Data

(60) Provisional application No. 63/380,037, filed on Oct. 18, 2022.

(51) Int. Cl.
*H02S 20/23* (2014.01)
*F16B 5/06* (2006.01)

(52) U.S. Cl.
CPC ............... *H02S 20/23* (2014.12); *F16B 5/06* (2013.01)

(58) Field of Classification Search
CPC ....... F24S 2025/6004; F24S 2025/6008; F24S 25/634; F24S 25/65; F24S 25/67
See application file for complete search history.

(56) References Cited

U.S. PATENT DOCUMENTS

| 2015/0311854 A1* | 10/2015 | Goehringer | H02S 20/00 29/525.08 |
| 2018/0062568 A1* | 3/2018 | Schulte | F24S 25/65 |
| 2021/0313926 A1* | 10/2021 | Cavieres | H02S 30/00 |
| 2022/0200522 A1 | 6/2022 | De Fresart | |

FOREIGN PATENT DOCUMENTS

| CA | 3192521 A1 | 3/2022 |
| WO | 2022183204 A1 | 9/2022 |

OTHER PUBLICATIONS

European Patent Office; International Search Report and Written Opinion issued in Int'l App. No. PCT/US2023/035301 dated Feb. 21, 2024; 10 pages.

\* cited by examiner

*Primary Examiner* — Daniel P Malley, Jr.
(74) *Attorney, Agent, or Firm* — MASCHOFF BRENNAN

(57) ABSTRACT

A module mounting assembly that couples a PV module to a support structure is provided. The module mounting assembly may include a mounting bracket, a mounting pin, and a clamp. The clamp may be configured to couple the mounting bracket to the support structure and the mounting pin may be configured to couple the mounting bracket to the PV module. The mounting pin may have a number of features and designs that facilitate positioning the mounting pin within the openings and retaining the mounting pin in an installed state.

12 Claims, 18 Drawing Sheets

MOUNTING PIN FOR PHOTOVOLTAIC MODULE MOUNTING SYSTEM

CROSS-REFERENCE TO RELATED APPLICATION

This application claims priority under 35 U.S.C. § 119 to U.S. Provisional Application No. 63/380,037, filed Oct. 18, 2022, the entire disclosure of which is incorporated herein by reference.

TECHNICAL FIELD

The embodiments discussed in the present disclosure are related to mounting pins for use in photovoltaic (PV) module mounting systems.

BACKGROUND

Generating power through the use of photovoltaic (PV) modules is becoming more popular both in commercial applications, where large numbers of PV modules may be arranged in rows to collect sunlight and generate energy, as well as personal applications, where a smaller number of PV modules may be installed on a roof or other location to generate energy for private use. Regardless of the application, PV modules must be securely mounted to an underlying support structure. To facilitate the mounting of a PV module to a support structure, PV modules often include a module rail that is coupled to the backside of a solar panel. The module rail may include one or more openings that can be used to secure a PV module to an underlying support structure.

In personal applications, this underlying support structure may include a frame that is mounted on a roof. In commercial applications, this underlying support structure may include a torque tube, which is mounted on one or more support posts, or piles. Torque tube interfaces may be used to secure the torque tube to the piles. In solar panel tracking systems (or systems in which the PV modules are able to track a location of the sun throughout the day), the torque tube may be coupled to the torque tube interface in a way that permits the torque tube to rotate relative to the pile.

To secure PV modules to underlying support structures, a variety of different types of connection mechanisms have been developed. However, conventional connection mechanisms often include a plurality of components and require specific tools to install, making them expensive, complicated, and time consuming to use. Accordingly, there is a need for a connection mechanism for mounting a PV module to a support structure that is not only cost effective, but is also quick and easy to install.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Embodiments of the present disclosure address problems associated with conventional mechanisms that are used to couple a PV module to an underlying support structure, such as a torque tube. In one or more embodiments of the present disclosure, a module mounting assembly that couples a PV module to a support structure is provided. The PV module may include a solar panel and a module rail that is coupled to the solar panel. The module rail may define one or more mounting pin openings. In some embodiments, the PV module may also include a frame in which the solar panel is secured. In this embodiment, the module rail may be coupled to either the frame or the solar panel.

The module mounting assembly may include a mounting bracket, one or more mounting pins, and a clamp. The clamp may be configured to couple the mounting bracket to the support structure. The mounting bracket may also define one or more mounting pin openings. To couple the PV module to the support structure, one or more pin openings in the module rail may be aligned with one or more pin openings in the mounting bracket and the mounting pin may be positioned within these openings.

The mounting pin may have a number of features and designs that facilitate positioning and retaining the mounting pin within the openings. For example, in some embodiments, at least a portion of an exterior surface of the mounting pin may include a lubricant coating to facilitate insertion of the mounting pin into the pin openings. In other embodiments, a mounting pin may include features that maintain the mounting pin secure within the openings.

For example, to assist in retaining the mounting pin within the openings, the mounting pin may be a mounting clip that includes a first arm, a second arm, and a connecting component. The connecting component may be connected to the first arm and the second arm. A width of the mounting clip, when in an uninstalled state, may be slightly larger than a width of the pin openings. The connecting component may be configured such that when a compressive force is applied to the first and second arms, the mounting pin is placed into a compressed state in which it can be inserted into mounting pin openings. Once positioned within the mounting pin openings, the compressive force may be released so that the arms of the mounting clip engage with the sides of the mounting pin openings. As provided herein, the mounting pin may have additional features that prevent the mounting pin from being inserted to far into the pin openings and other features that prevent the mounting pin permanent deformation due to an excessive compressive force.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1A:
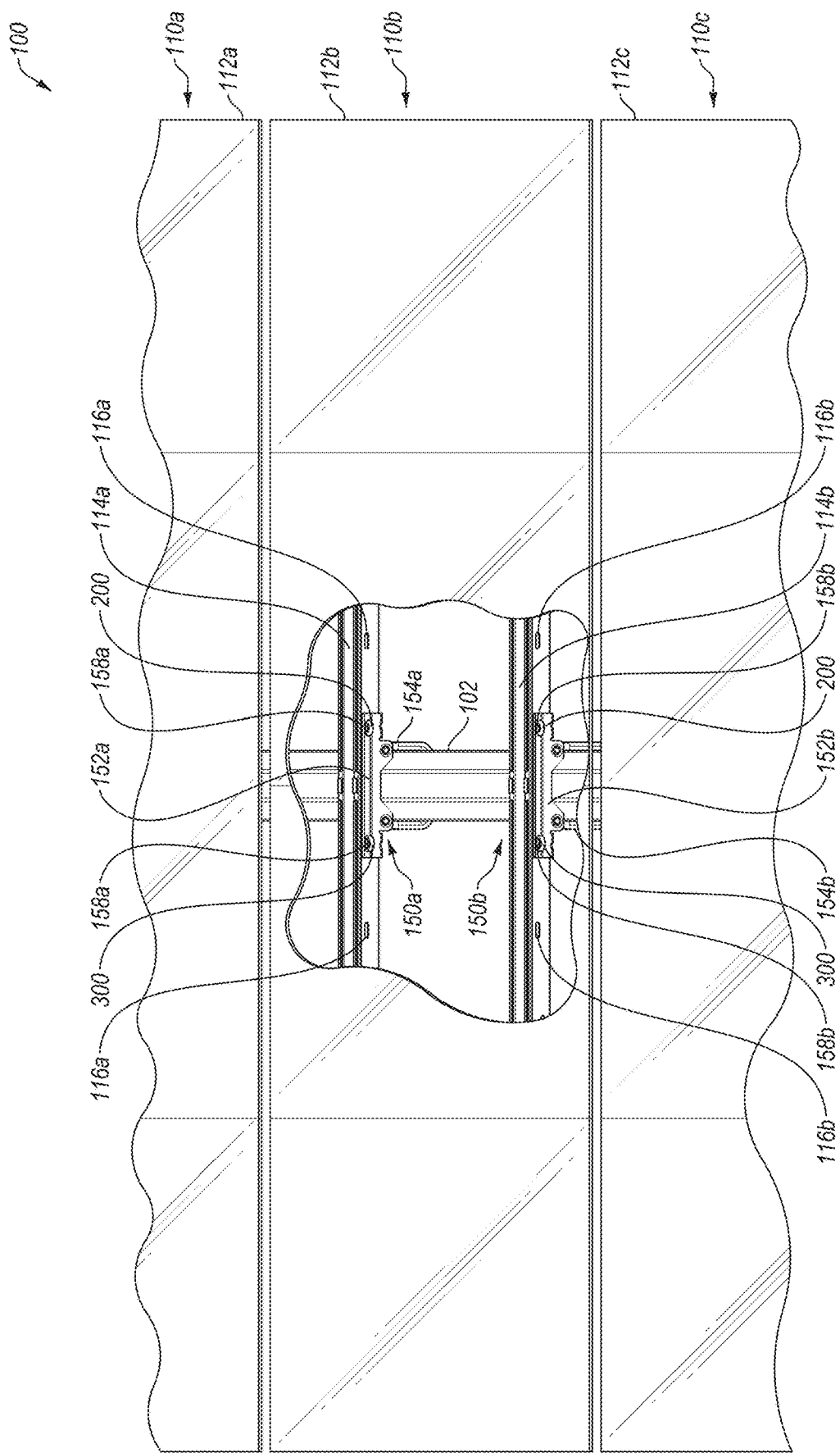
FIGS. 1A-1D illustrate an exemplary PV module mounting system.

Embodiments of the PV module mounting system disclosed herein may include a PV module, a module mounting assembly, and a support structure. The PV module may include a solar panel and a module rail. The module rail may be attached to a back surface of the solar panel. The module rail may extend along at least a portion of a length of the back surface of the solar panel. The module rail may also include one or more openings that can be used to secure the PV module to the support structure.

The PV module may be secured to the support structure. In some embodiments, the support structure may be a torque tube, a box frame, a ladder frame, a space frame, or another frame or structure suitable for mounting PV modules. In some embodiments, the support structure may be anchored to a base structure, such as a roof on a house or the ground.

A module mounting assembly may be used to secure the PV module to the support structure. The module mounting assembly may include one or more mounting pins, a mounting bracket, and a coupling mechanism that secures the mounting bracket to the support structure. The mounting bracket may also include one or more openings that may correspond in size and shape to the one or more openings on the module rail.

To mount the PV module to the support structure, the mounting bracket may be coupled to the mounting structure. Straps, clamps, screws, or another mechanical connecting mechanism may be used to couple the mounting bracket to the mounting structure. The one or more openings in the module rail may be aligned with the one or more holes in the mounting bracket. The mounting pins may be inserted through the aligned holes and a friction attachment between the pins and the holes may maintain the pins within the holes to secure the PV module to the support structure.

As provided in more detail herein, the mounting pins may include features and designs to facilitate insertion of the pins into the holes and to ensure that the pins remain secured within the holes. Unlike many conventional mounting technologies, the module mounting assemblies of the present disclosure may not require specialized tools for installation. For example, some conventional mounting technologies may require a hammer drill with a specialized adapter to apply force sufficient to install the mounting pins. The mounting pins of the present disclosure, according to some embodiments, may reduce complexity of an installation process by being compatible with standard tools such as pliers. Additionally or alternatively, the mounting pins according to some embodiments may further reduce complexity of the installation process by being capable of being installed manually, without any tools at all.

These and other embodiments of the present disclosure will be explained with reference to the accompanying Figures. It is to be understood that the Figures are diagrammatic and schematic representations of such example embodiments, and are not limiting, nor are they necessarily drawn to scale. In the Figures, features with like numbers indicate like structure and function unless described otherwise.

FIGS. 1A-1D illustrates an exemplary PV module mounting system 100 that includes a support structure 102, PV modules 110a, 110b, and 110c, and module mounting assemblies 150a and 150b. In the PV module mounting system 100, the support structure 102 includes a torque tube. However, in other embodiments, a support structure may include a box frame, a ladder frame, a space frame, or another frame or structure suitable for mounting PV modules. The support structure 102 may also include another structure (not shown) that secures the torque tube to an underlying base surface. For example, in a ground mounted system, a support structure may include a pile that secures the torque tube to the ground. In a rooftop mounted system, a support structure may include a component that secures the torque tube to a rooftop.

The PV modules 110a, 110b, and 110c each include solar panels 112a, 112b, and 112c. Each of the solar panels 112a, 112b, and 112c include module rails that are attached to a backside of the solar panels 112a, 112b, and 112c. For example, in FIG. 1A, module rails 114a and 114b are visible through the cutaway portion of solar panel 112b. Additional module rails (not shown) may be similarly secured to the back sides of solar panels 112a and 112c. These module rails may also include a series of holes or openings that may be used to secure the solar panels to a support structure. For example, openings 116a in the module rail 114a and openings 116b in the module rail 114b can be seen in the system 100. These openings can have any shape and/or size. The openings 116a in the module rail 114a and openings 116b in the module rail 114b are oval in shape.

The module mounting assemblies 150a and 150b include mounting brackets 152a and 152b. The mounting brackets 152a and 152b are coupled to the support structure 102 through clamps 154a and 154b. The clamps 154a and 154b extend around the support structure 102 to retain the mounting brackets 152a and 152b in fixed positions relative to the support structure 102. The mounting brackets 152a and 152b may have cross-sectional U shapes, such that at least a portion of the module rails 114a and 114b can be seated inside of the mounting brackets 152a and 152b.

The mounting brackets 152a and 152b include openings 158a and 158b through which mounting pins are inserted. These openings 158a and 158b in the mounting brackets 152a and 152b are aligned with openings in the module rails 114a and 114b and are consistent in size and shape such that mounting pins can extend through openings in both the mounting brackets 152a and 152b and module rails 114a and 114b. The mounting pins may be retained within these openings through a friction fit to couple the PV module 110b to the support structure 102.

Figure 2A:
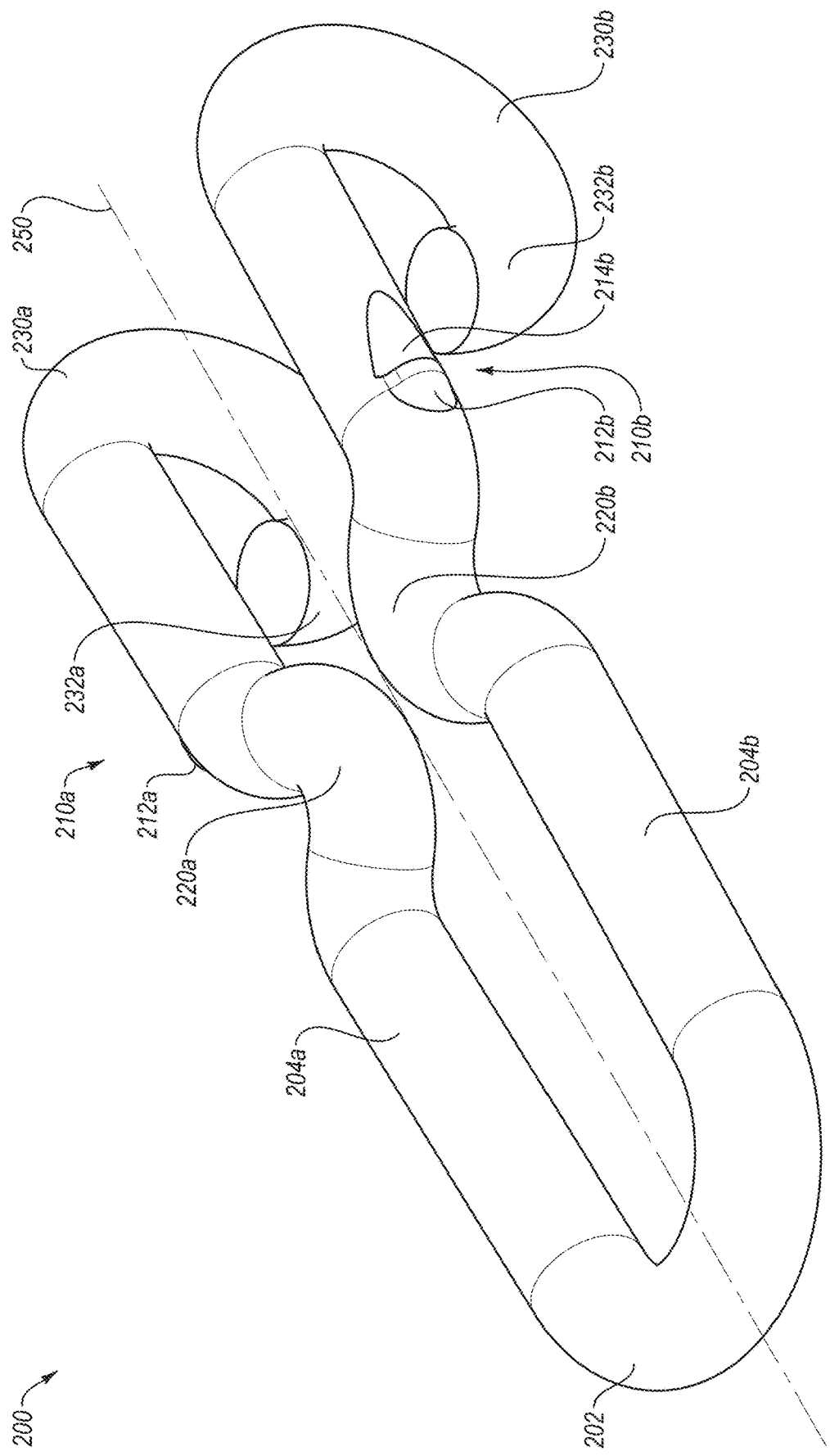
FIGS. 2A-2B illustrate a first exemplary mounting pin.
Figure 2B:
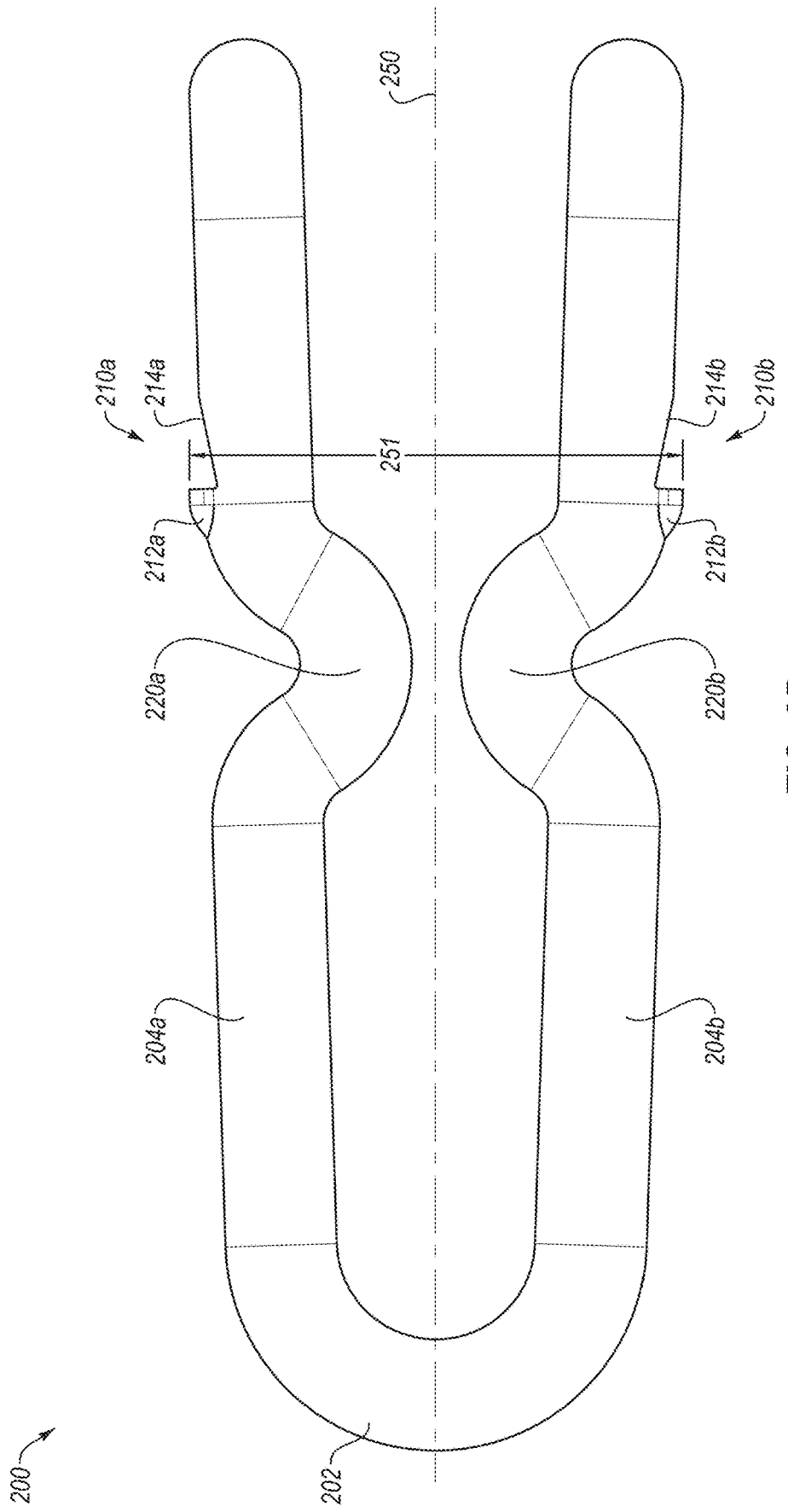
Figure 3A:
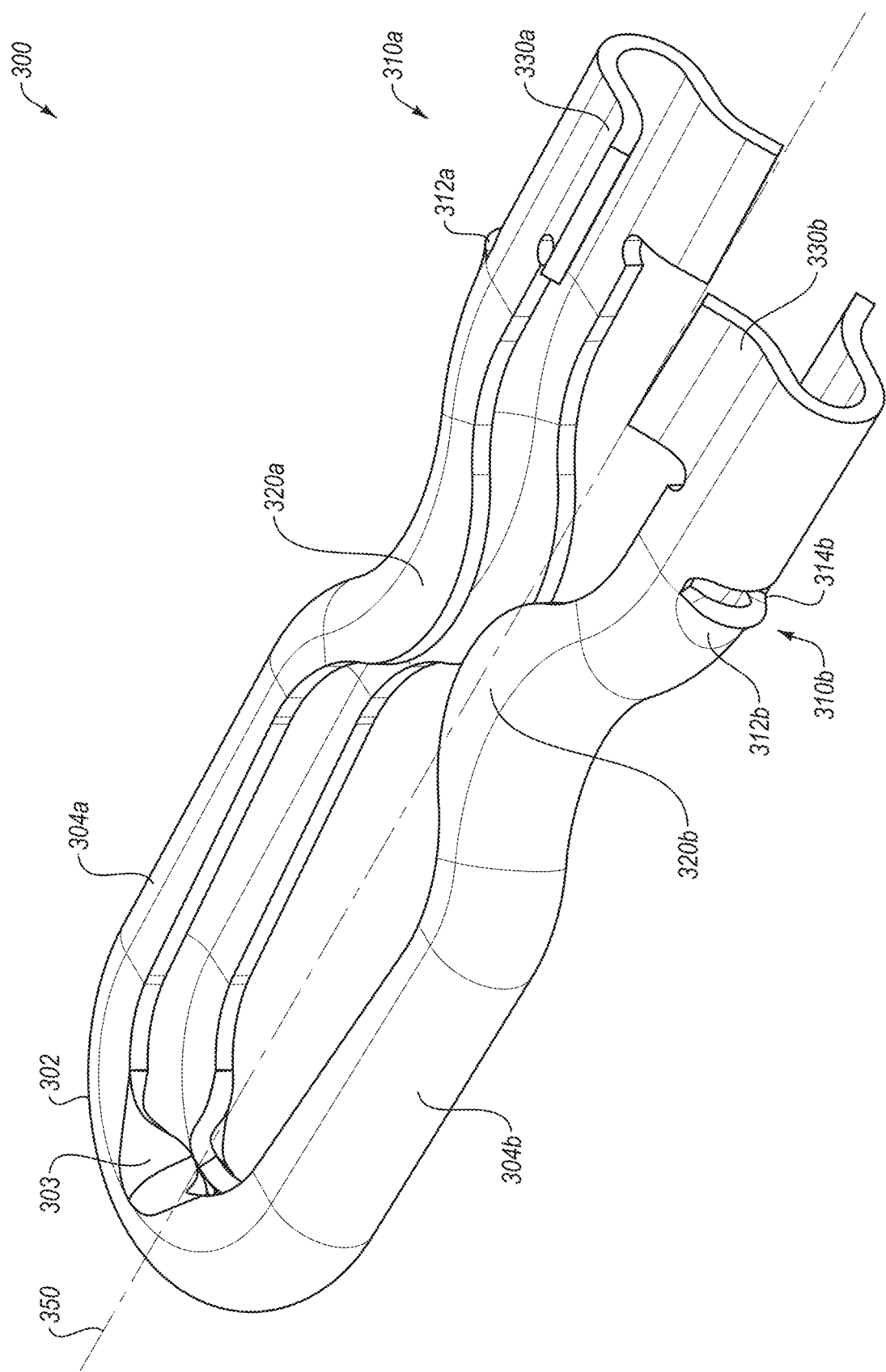
FIGS. 3A-3B illustrate a second exemplary mounting pin.
Figure 3B:
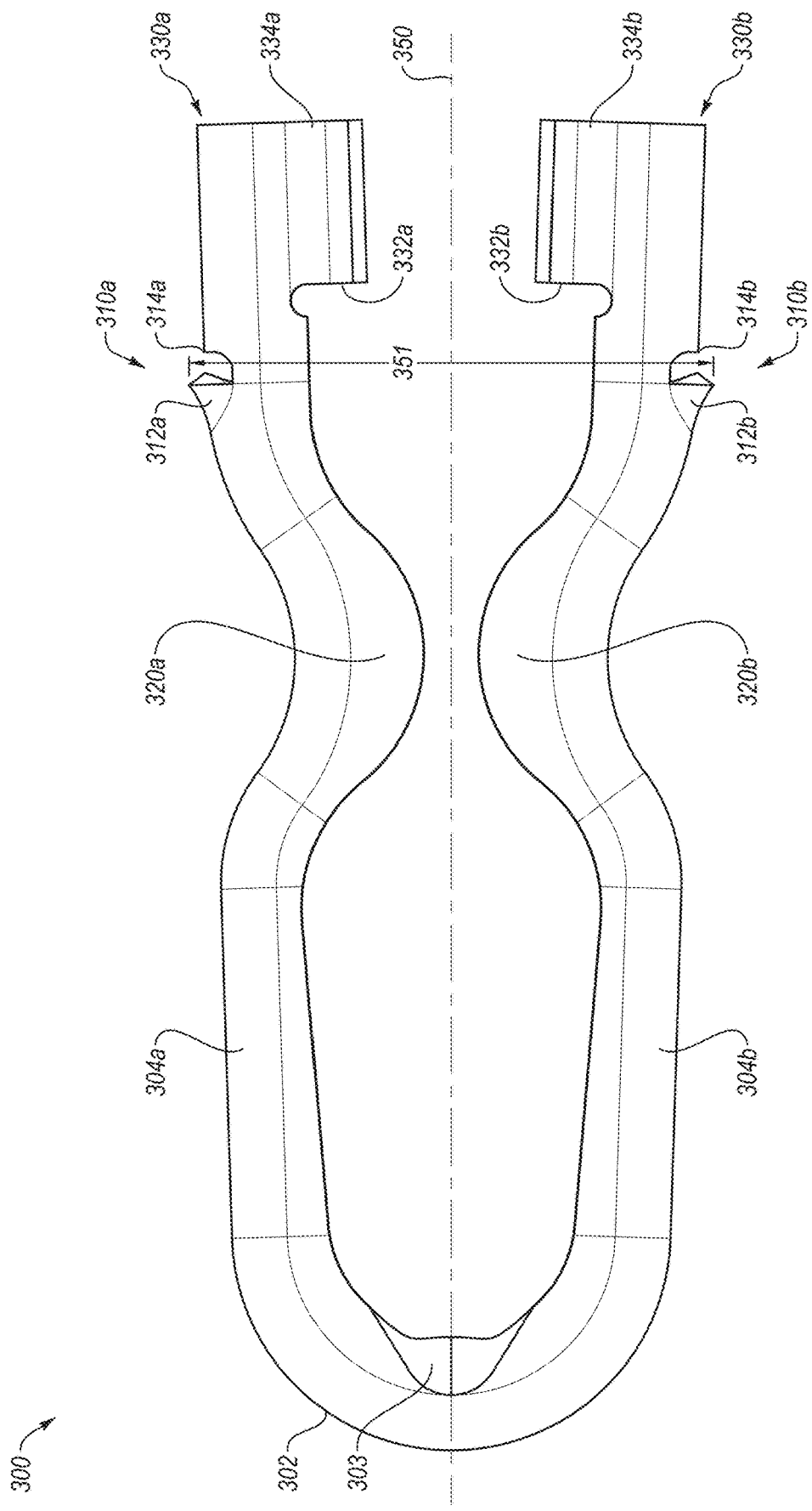

A wide variety of different mounting pins or clips may be inserted into the mounting pin openings 116a and 158a to secure the module rail 114a to the support structure 102. In the PV module mounting system 100, a pair of mounting clips 200 and a pair of mounting clips 300 are used to secure the module rail 114a to the support structure 102. The mounting clips 200 are illustrated in FIGS. 2A-2B and are described in more detail hereafter in connection with FIGS. 2A-2B. The mounting clips 300 are illustrated in FIGS. 3A-3B and are described in more detail in connection with FIGS. 3A-3B. Additional embodiments of possible mounting pins are provided in FIGS. 4-7.

Figure 1B:
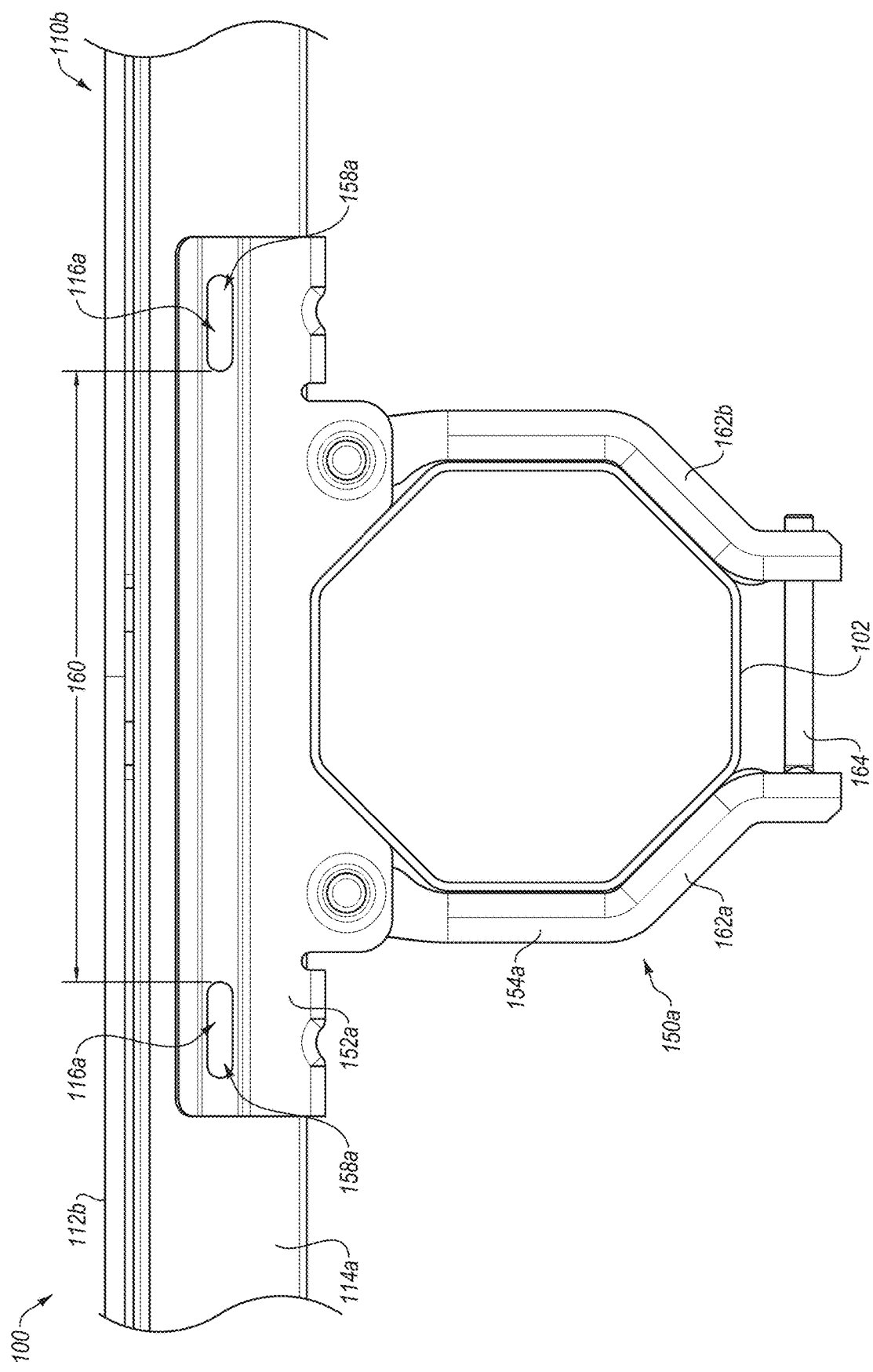

FIG. 1B illustrates a side-sectional view of a portion of the PV module mounting system 100 of FIG. 1. Specifically, FIG. 1B illustrates the support structure 102 and the PV module 110b, including the solar panel 112b and the module rail 114a. FIG. 1B also illustrates the module mounting assembly 150a, including the mounting bracket 152a and the clamp 154a. The module mounting assembly 150a in FIG. 2 lacks the mounting clips 200 and 300. Rather, the mounting pin openings 116a in the module rail 114a and the mounting pin openings 158a in the mounting bracket 152a are shown. As can be seen, the mounting pin openings 116a and 158a are in alignment and are consistent in size and shape (oval). In some embodiments, a distance 160 between the pin openings 116a and the distance 160 between the pin openings 158a may be between approximately one hundred millimeters (mm) and six hundred mm.

The clamp 154a may circumscribe all or a portion of the support structure. For example, the clamp 154a includes arms 162a and 162b that are pivotally secured to the mounting bracket 152a. A bolt 164 may secure bottom portions of the arms 162a and 162b together to compress the support structure 102 between the arms 162a and 162b. When installing the module mounting assembly 150a to the support structure 102, the bolt 164 may be removed and the arms 162a and 162b may be extend away from each other and around the support structure 102. Once around the support structure 102, the bolt 164 may be inserted and tightened to compress the support structure 102 between the arms 162a and 162b.

Figure 1C:
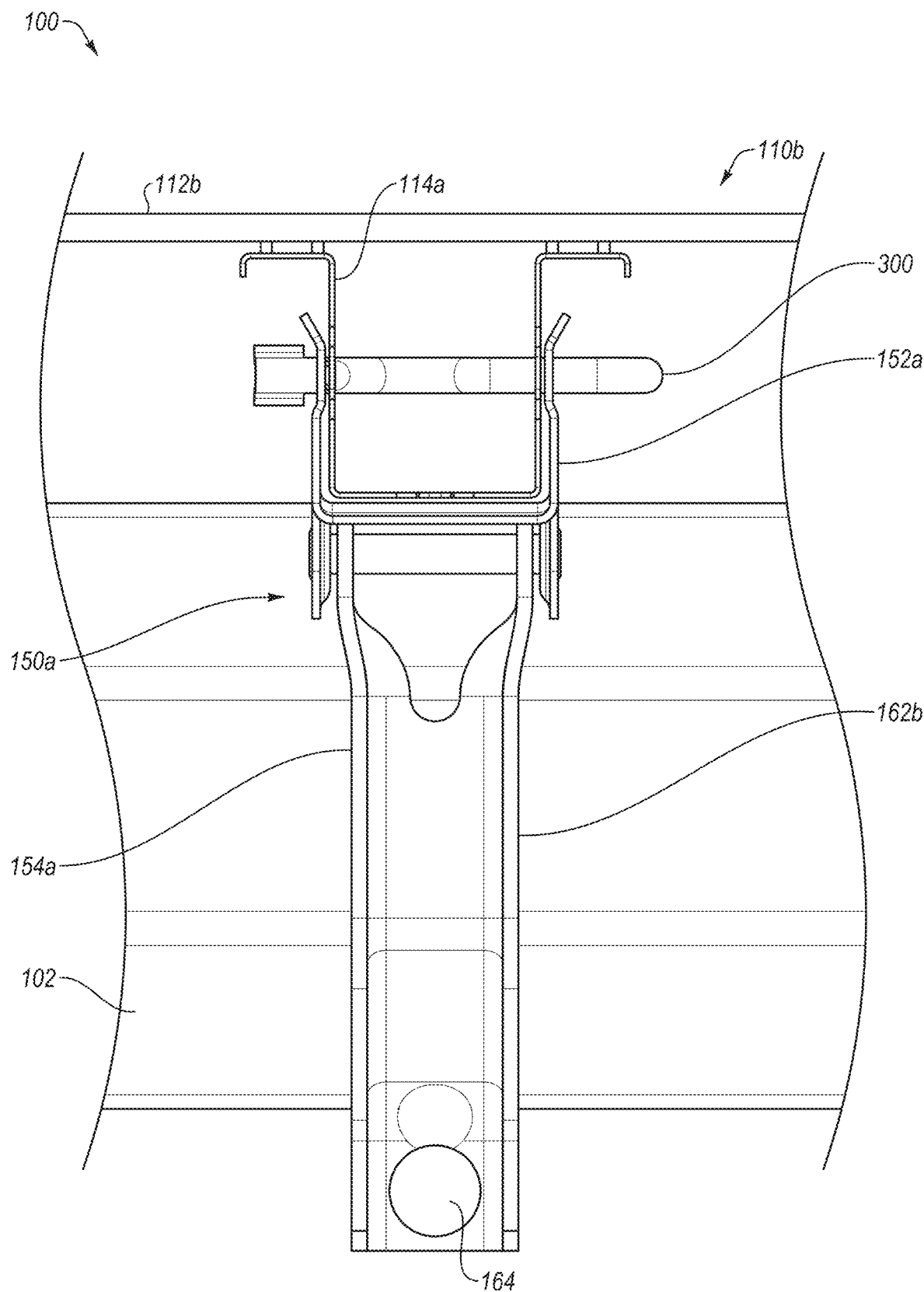

FIG. 1C illustrates another side-sectional view of the PV module mounting system 100 that shows a portion of the PV module 110b including the solar panel 112b and the module rail 114a, the support structure 102, and the module mounting assembly 150a including the clamp 154a, the mounting bracket 152a, and the mounting clip 300 in an installed state.

Figure 1D:
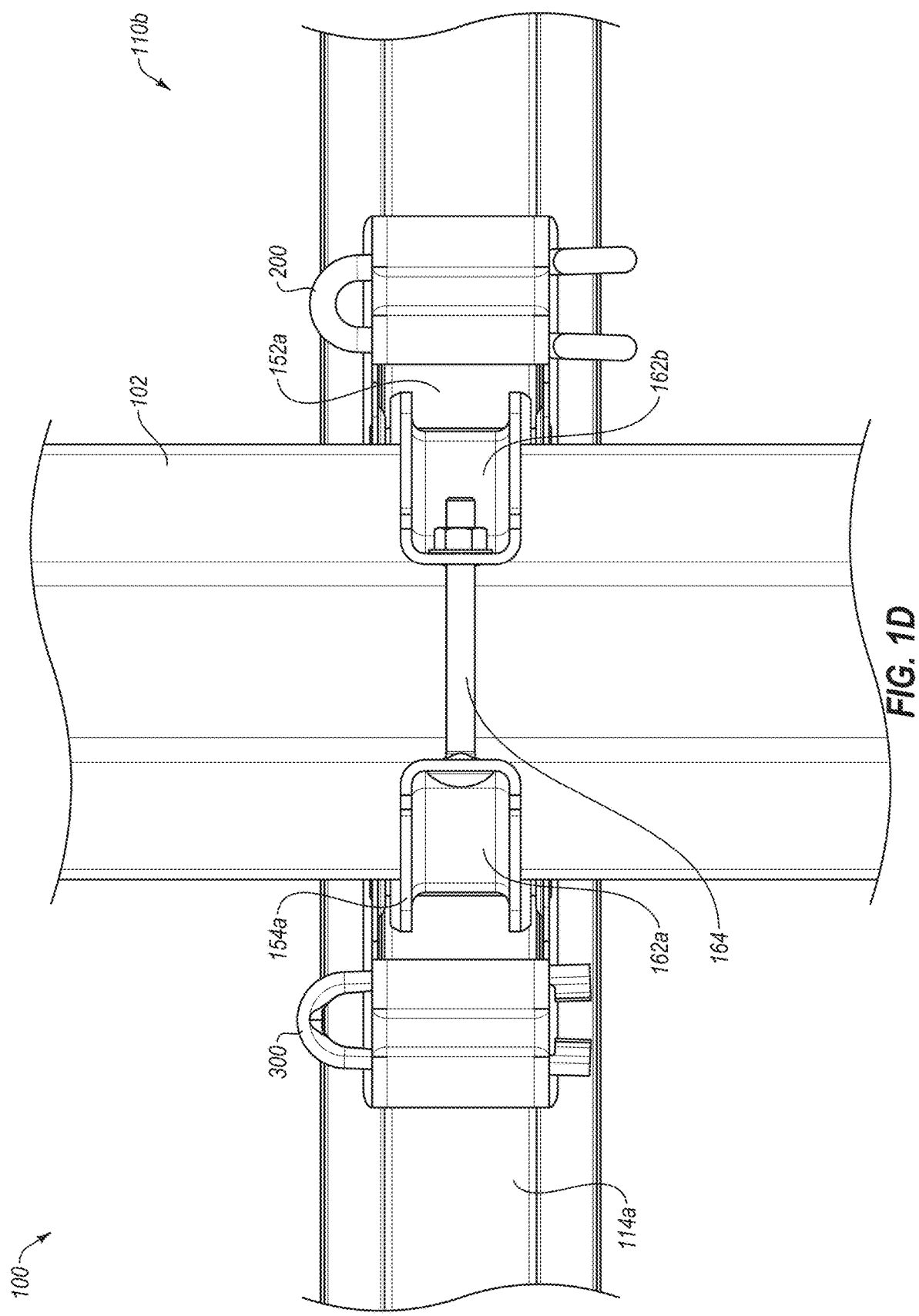

As can be seen in FIG. 1C, the mounting bracket 152a has a cross sectional U shape that defines an opening. In some embodiments, a distance between the sides of the mounting bracket 152a may be equal to or between forty-two mm and seventy-five mm. During installation, a portion of the module rail 114a may be inserted into the opening defined by the mounting bracket 152a. The module rail 114a may mate with the opening defined by the mounting bracket 152a such that a portion of the module rail 114a is seated within this opening. In addition, during installation, the module rail 114a may be positioned relative to the mounting bracket 152a to position the clip openings 158a in the mounting bracket 152a proximate to the clip openings 116a in the module rail 114a. FIG. 1D illustrates a bottom sectional view of the system 100 with mounting clips 200 and 300 in an installed state.

While the PV module mounting system 100 uses mounting pins 200 and 300 to secure the PV module 110b to the support structure 102, any number of different mounting pins or clips may be used to secure the PV module 110b to the support structure 102. FIGS. 2-7 illustrate several examples of possible mounting pins that could be used in the system 100, including the mounting clips 200 and 300 that are shown in the system 100.

FIGS. 2A-2B illustrate the mounting clip 200. Different views of the mounting clip 200 are provided in FIGS. 2A-2B. For example, FIG. 2A illustrates a perspective view of the mounting clip 200 and FIG. 2B illustrates a top view of the mounting clip 200.

The mounting clip 200 includes a connecting component 202, a first arm 204a, and a second arm 204b. The connecting component 202 is connected to the first arm 204a and the second arm 204b. The first arm 204a and the second arm 204b extend from the connecting component 202 in a direction that follows a longitudinal axis 250 of the mounting clip 200.

The first arm 204a includes a first retention component 210a. The first retention component 210a includes a first tab 212a and a first slot 214a (shown in FIG. 2B). The first tab 212a is a protruding feature that extends away from the surface of the first arm 204a. The first slot 214a is a recessed feature in the surface of the first arm 204a that is positioned next to the first tab 212a. Similar features are included on the second arm 204b. Specifically, the second arm 204b includes a second retention component 210b. The second retention component 210b includes a second tab 212b and a second slot 214b. The second tab 212b is a protruding feature that extends away from the surface of the second arm 204b. The second slot 214b is a recessed feature in the surface of the second arm 204b that is positioned next to the second tab 212b.

The first and second arms 204a and 204b also include first and second compression limiting components 220a and 220b, respectively. The first and second compression limiting components 220a and 220b include curved portions of the first and second arms 204a and 204b that extend inward toward each other. The first and second arms 204a and 204b further include first and second stop components 230a and 230b, respectively. The first and second stop components 230a and 230b are physically positioned at distal ends, opposite the connecting component 202, of the first and second arms 204a and 204b.

The connecting component 202 may be elastically deformable such that a distance between the first and second arms 204a and 204b may be selectively adjustable by applying a pressure to the first and second arms 204a and 204b. In an uninstalled state, or when the mounting clip 200 is not positioned within a mounting pin opening in a module rail or a mounting pin opening in a mounting bracket, the mounting clip 200 may have a width 251 (shown in FIG. 2B) between first and second tabs 212a and 212b that is greater than a width of one or both of a mounting pin opening in a module rail and a mounting pin opening in a mounting bracket. For example, with reference to the mounting pin opening 116a in the module rail 114a and the mounting pin opening 158a in the mounting bracket 152a of the PV module mounting system 100, the width 251 of the mounting clip 200 in an uninstalled state is greater than the length of the mounting pin openings 116a and 158a. Due to the width 251 of the mounting clip 200 being greater than the length of the mounting pin openings 116a and 158a in the uninstalled state, an increased an amount of mechanical force may be applied by the mounting clip 200 to one or both of the mounting pin openings 116a and 158a.

During installation, a tool or other item (such as a hand of an installer) may apply a compressive force to the first and second arms 204a and 204b. For example, the compressive force may be applied at the distal ends of the first and second arms 204a and 204b. As another example, the compressive force may be applied to the first and second stop components 230a and 230b. The compressive force may cause the first and second arms 204a and 204b to move inwards towards the longitudinal axis 250. In addition, the compressive force may cause the connecting component 202 to deform to apply or load a spring force to the first and second arms 204a and 204b. In some embodiments, the compressive force may cause the first and second arms 204a and 204b to move inward towards the longitudinal axis 250 until the compressive force equals the spring force. Applying a compressive force may thus cause the mounting clip 200 to transition from an uninstalled state to a compressed state in which the width 251 of the mounting clip 200 is less than the width 251 in the uninstalled state.

In some embodiments, the first and second compression limiting components 220a and 220b may limit an amount of compression of the mounting clip 200. For example, the compressive force may cause the first and second arms 204a and 204b to move inward towards the longitudinal axis 250 until the first compression limiting component 220a and the second compression limiting component 220b physically contact each other. The first compression limiting component 220a and the second compression limiting component 220b may prevent the mounting clip 200 from being over compressed in a direction along a lateral axis (perpendicular to the longitudinal axis 250) of the mounting clip 200. In addition, the first and second compression limiting components 220a and 220b may prevent the connecting component 202 from yielding and permanently deforming.

In the compressed state, the distance between the first and second tabs 212a and 212b may be reduced to be less than the length of one or both of a mounting pin opening in a module rail and a mounting pin opening in a mounting bracket. For example, in the PV module mounting system 100 where a pair of mounting clips 200 are installed within the mounting pin openings 116a and 158a, the width 251 of the mounting clip 200 in the compressed state would be less than the length of the mounting pin openings 116a and 158a. Thus, in the compressed state, the mounting clip 200 may be freely inserted into the mounting pin openings 116a and 158a. The mounting clips 200 may be inserted into these openings until the first and/or second stop components 230a and/or 230b physically contact or engage with the mounting bracket 152a. The first and second stop components 230a and 230b may limit an insertion depth of the mounting clip 200. For example, a surface 232a of the first stop component 230a and/or a surface 232b of the second stop component 230b may physically contact an external surface a mounting bracket when the mounting clip 200 is in an installed state.

After the mounting clip 200 is inserted into a mounting pin opening in a module rail and a mounting pin opening in a mounting bracket, the compressive force may be released, which may cause the mounting clip 200 to transition to the installed state. In the installed state, the connecting component 202 may apply a spring force to the first and second arms 204a and 204b in directions away from the longitudinal axis 250. The spring force may cause the first and second arms 204a and 204b to move away from the longitudinal axis 250 and engage with one or both of the module rail and the mounting bracket. With this outward spring force, the first and second retention components 210a and 210b may prevent the mounting clip 200 from disengaging from within the clip openings.

In some embodiments, the first and second retention components 210a and 210b may interface with an inside surface of a module rail to prevent the mounting clip 200 from backing out of the openings after installation. In these and other embodiments, the first and second tabs 212a and 212b may engage or contact the mounting bracket, the module rail, or some combination thereof.

In the installed state, the first and second retention components 210a and 210b may prevent movement of the mounting clip 200 relative to the mounting bracket and the module rail in a direction away from the connecting component 202 along the longitudinal axis 250. Further, in the installed state, the spring force may prevent or restrain movement of a mounting bracket and a solar panel in directions along the lateral axis (perpendicular to the longitudinal axis 250) of the mounting clip 200.

In some embodiments, the first tab 212a may be positioned relative the first stop component 230a to prevent backing out of the mounting clip 200. In these and other embodiments, the second tab 212b may be positioned relative the second stop component 230b to prevent backing out of the mounting clip 200. A distance between the first tab 212a and the first stop component 230a may be based on a thickness of a sidewall of a module rail, a mounting bracket, or some combination thereof. The distance between the first tab 212a and the first stop component 230a may cause the first retention component 210a and the first stop component 230a to prevent movement of the mounting clip 200 in a direction along the longitudinal axis 250 when installed. A distance between the second tab 212b and the second stop component 230b may be based on a thickness of the sidewall of the module rail, the mounting bracket, or some combination thereof. The distance between the second tab 212b and the second stop component 230b may cause the second retention component 210b and the second stop component 230b to prevent movement of the mounting clip 200 in the direction along the longitudinal axis 250 when installed.

In some embodiments, the spring force applied by the connecting component 202 in the installed state may be equal to or between one pound of force and one hundred pounds of force. The spring force applied by the connecting component 202 may account for external forces applied to a solar tracking system to prevent movement of a mounting bracket and a solar panel in directions along the lateral axis (perpendicular to the longitudinal axis 250). For example, the spring force may account for forces applied to a PV module mounting system by wind, snow, rain, gravity, or any other appropriate force. In some embodiments, the spring force may be sufficient to prevent movement of the mounting bracket relative to the solar panel but small enough to permit the installer to compress the mounting clip 200 by hand.

To remove or uninstall the mounting clip 200, a compressive force may again be applied to the distal ends of the first and second arms 204a and 204b to cause the first and second arms 204a and 204b to move inwards towards the longitudinal axis 250 to cause the mounting clip 200 to transition to the compressed state. In the compressed state, the mounting clip 200 may be freely removed from mounting clip openings.

In some embodiments, the first and second arms 204a and 204b, the connecting component 202, or some combination thereof may include a single unibody piece of round rod material. In these and other embodiments, the round rod material may include a circular cross sectional profile. A height of the mounting clip 200 may be slightly less than a height of the clip openings.

In some embodiments, the mounting clip 200 may be formed using a wire forming device. In these and other embodiments, the mounting clip 200 may be formed without using specialized tools or specialized training. In these and other embodiments, the mounting clip 200 may include a spring clip. In some embodiments, the first retention component 210a may include only the first tab 212a and not the first slot 214a. In these and other embodiments, the second retention component 210b may include only the second tab 212a and not the second slot 214b.

In some embodiments, the first and second stop components 230a and 230b may form a semi-circles. In other embodiments, the first and second stop components 230a and 230b may form different shapes. For example, the first and second stop components 230a and 230b may form rectangles, squares, triangles, half-circles, hexagons, or any other appropriate shape. The first and second stop components 230a and 230b may further include tool interfaces. For examples, the first and second stop components 230a and 230b may define tool cutouts configured to receive a tool to compress the mounting clip 200.

In some embodiments, in order to facilitate positioning of the mounting clip 200 within mounting clip openings, all or part of an exterior surface of the mounting clip 200 may include a lubricant coating. This lubricant coating may be any type of wet or dry lubricant, including wax, oil, grease, silicon, graphite, etc. In some embodiments, an entire exterior surface of the mounting clip 200 may have the lubricant coating. In other embodiments, only the portions of the mounting clip 200 that contact sides of the mounting holes during installation may include the lubricant coating.

FIGS. 3A-3B illustrate the mounting clip 300. Different views of the mounting clip 300 are provided in FIGS. 3A-3B. For example, FIG. 3A illustrates a perspective view of the mounting clip 300 and FIG. 3B illustrates a top view of the mounting clip 300.

The mounting clip 300 includes a connecting component 302, a first arm 304a, and a second arm 304b. The connecting component 302 is connected to the first arm 304a and the second arm 304b. The first arm 304a and the second arm 304b may extend from the connecting component 302 in a direction that follows a longitudinal axis 350 of the mounting clip 300.

The first arm 304a includes a first retention component 310a. The first retention component 310a includes a first tab 312a and a first slot 314a (shown in FIG. 3B). The first tab 312a is a protruding feature that extends away from the surface of the first arm 304a. The first slot 314a is a recessed feature in the surface of the first arm 304a that is positioned next to the first tab 312a. Similar features are included on the second arm 304b. Specifically, the second arm 304b includes a second retention component 310b. The second retention component 310b includes a second tab 312b and a second slot 314b. The second tab 312b is a protruding feature that extends away from the surface of the second arm 304b. The second slot 314b is a recessed feature in the surface of the second arm 304b that is positioned next to the second tab 312b.

The first and second arms 304a and 304b also include first and second compression limiting components 320a and 320b, respectively. The first and second compression limiting components 320a and 320b include curved portions of the first and second arms 304a and 304b that extend inward toward each other. The first and second arms 304a and 304b further include first and second stop components 330a and 330b, respectively. The first and second stop components 330a and 330b are physically positioned at distal ends, opposite the connecting component 302, of the first and second arms 304a and 304b.

The connecting component 302 may be elastically deformable such that a distance between the first and second arms 304a and 304b may be selectively adjustable by applying a pressure to the first and second arms 304a and 304b. The connecting component 302 includes a pinched edge 303 that facilitates deformation of the connecting component 302. In an uninstalled state, or when the mounting clip 300 is not positioned within a mounting pin opening in a module rail or a mounting pin opening in a mounting bracket, the mounting clip 300 may have a width 351 (shown in FIG. 3B) between first and second tabs 312a and 312b that is greater than a width of one or both of a mounting pin opening in a module rail and a mounting pin opening in a mounting bracket. For example, with reference to the mounting pin opening 116a in the module rail 114a and the mounting pin opening 158a in the mounting bracket 152a of the PV module mounting system 100, the width 351 of the mounting clip 300 in an uninstalled state is greater than the length of the mounting pin openings 116a and 158a. Due to the width 351 of the mounting clip 300 being greater than the length of the mounting pin openings 116a and 158a in the uninstalled state, an increased an amount of mechanical force may be applied by the mounting clip 300 to one or both of the mounting pin openings 116a and 158a.

During installation, a tool or other item (such as a hand of an installer) may apply a compressive force to the first and second arms 304a and 304b. For example, the compressive force may be applied at the distal ends of the first and second arms 304a and 304b. As another example, the compressive force may be applied to the first and second stop components 330a and 330b. The compressive force may cause the first and second arms 304a and 304b to move inwards towards the longitudinal axis 350. In addition, the compressive force may cause the connecting component 302 to deform to apply or load a spring force to the first and second arms 304a and 304b. In some embodiments, the compressive force may cause the first and second arms 304a and 304b to move inward towards the longitudinal axis 350 until the compressive force equals the spring force. Applying a compressive force may thus cause the mounting clip 300 to transition from an uninstalled state to a compressed state in which the width 351 of the mounting clip 300 is less than the width 351 in the uninstalled state.

In some embodiments, the first and second compression limiting components 320a and 320b may limit an amount of compression of the mounting clip 300. For example, the compressive force may cause the first and second arms 304a and 304b to move inward towards the longitudinal axis 350 until the first compression limiting component 320a and the second compression limiting component 320b physically contact each other. The first compression limiting component 320a and the second compression limiting component 320b may prevent the mounting clip 300 from being over compressed in a direction along a lateral axis (perpendicular to the longitudinal axis 350) of the mounting clip 300. In addition, the first and second compression limiting components 320a and 320b may prevent the connecting component 302 from yielding and permanently deforming.

In the compressed state, the distance between the first and second tabs 312a and 312b may be reduced to be less than the length of one or both of a mounting pin opening in a module rail and a mounting pin opening in a mounting bracket. For example, in the PV module mounting system 100 where a pair of mounting clips 300 are installed within the mounting pin openings 116a and 158a, the width 351 of the mounting clip 300 in the compressed state would be less than the length of the mounting pin openings 116a and 158a. Thus, in the compressed state, the mounting clip 300 may be freely inserted into the mounting pin openings 116a and 158a. The mounting clips 300 may be inserted into these openings until the first and/or second stop components 330a and/or 330b physically contact or engage with the mounting bracket 152a. The first and second stop components 330a and 330b may limit an insertion depth of the mounting clip 300. For example, a surface 332a of the first stop component 330a and/or a surface 332b of the second stop component 330b may physically contact an external surface a mounting bracket when the mounting clip 300 is in an installed state.

After the mounting clip 300 is inserted into a mounting pin opening in a module rail and a mounting pin opening in a mounting bracket, the compressive force may be released, which may cause the mounting clip 300 to transition to the installed state. In the installed state, the connecting component 302 may apply a spring force to the first and second arms 304a and 304b in directions away from the longitudinal axis 350. The spring force may cause the first and second arms 304a and 304b to move away from the longitudinal axis 350 and engage with one or both of the module rail and the mounting bracket. With this outward spring force, the first and second retention components 310a and 310b may prevent the mounting clip 300 from disengaging from within the clip openings.

In some embodiments, the first and second retention components 310a and 310b may interface with an inside surface of a module rail to prevent the mounting clip 300 from backing out of the openings after installation. In these and other embodiments, the first and second tabs 312a and 312b may engage or contact the mounting bracket, the module rail, or some combination thereof.

In the installed state, the first and second retention components 310a and 310b may prevent movement of the mounting clip 300 relative to the mounting bracket and the module rail in a direction away from the connecting component 302 along the longitudinal axis 350. Further, in the installed state, the spring force may prevent or restrain movement of a mounting bracket and a solar panel in directions along the lateral axis (perpendicular to the longitudinal axis 350) of the mounting clip 300.

In some embodiments, the first tab 312a may be positioned relative the first stop component 330a to prevent backing out of the mounting clip 300. In these and other embodiments, the second tab 312b may be positioned relative the second stop component 330b to prevent backing out of the mounting clip 300. A distance between the first tab 312a and the first stop component 330a may be based on a thickness of a sidewall of a module rail, a mounting bracket, or some combination thereof. The distance between the first tab 312a and the first stop component 330a may cause the first retention component 310a and the first stop component 330a to prevent movement of the mounting clip 300 in a direction along the longitudinal axis 350 when installed. A distance between the second tab 312b and the second stop component 330b may be based on a thickness of the sidewall of the module rail, the mounting bracket, or some combination thereof. The distance between the second tab 312b and the second stop component 330b may cause the second retention component 310b and the second stop component 330b to prevent movement of the mounting clip 300 in the direction along the longitudinal axis 350 when installed.

In some embodiments, the spring force applied by the connecting component 302 in the installed state may be equal to or between one pound of force and one hundred pounds of force. The spring force applied by the connecting component 302 may account for external forces applied to a solar tracking system to prevent movement of a mounting bracket and a solar panel in directions along the lateral axis (perpendicular to the longitudinal axis 350). For example, the spring force may account for forces applied to a PV module mounting system by wind, snow, rain, gravity, or any other appropriate force. In some embodiments, the spring force may be sufficient to prevent movement of the mounting bracket relative to the solar panel but small enough to permit the installer to compress the mounting clip 300 by hand.

To remove or uninstall the mounting clip 300, a compressive force may again be applied to the distal ends of the first and second arms 304a and 304b to cause the first and second arms 304a and 304b to move inwards towards the longitudinal axis 350 to cause the mounting clip 300 to transition to the compressed state. In the compressed state, the mounting clip 300 may be freely removed from mounting clip openings.

In some embodiments, the first and second arms 304a and 304b, the connecting component 302, or some combination thereof may include a single unibody piece of material. In these and other embodiments, the material may include a C-shaped cross sectional profile. A height of the mounting clip 200 may be slightly less than a height of the clip openings.

A depth of the channel in the C-shaped cross sectional profile of the mounting clip 300 may vary throughout the mounting clip 300. The depth may vary to compensate for different forces that may be applied to the mounting clip 300. The depth may vary to fine tune the spring force of the mounting clip 300 at different positions along the first and second arms 304a and 304b. A thickness of the material may also vary or be adjusted to compensate for different forces that may be applied to the mounting clip 300. The material of the mounting clip 300 may include sheet metal, sheet stock, or any other appropriate material.

In some embodiments, the mounting clip 300 may be formed using a stamping process, a bending process, or some combination thereof. In these and other embodiments, the mounting clip 300 may include a spring clip. In some embodiments, the first retention component 310a may include only the first tab 312a and not the first slot 314a. In these and other embodiments, the second retention component 310b may include only the second tab 312a and not the second slot 314b.

In some embodiments, the first and second stop components 330a and 330b may include flanges 334a and 334b, respectively. The flanges 334a and 334b may alternatively be called wings. In some embodiments, the flanges 334a may extend diagonally away from the first arm 304a generally toward the longitudinal axis 350. In these and other embodiments, the flanges 334a may extend away from the first arm 304a and away from a transverse plane of the mounting clip 300. The transverse plane may include a flat plane that extends along the longitudinal axis 350 and the lateral axis (perpendicular to the longitudinal axis 350) of the mounting clip 300. For example, the top view illustrated in FIG. 3B is perpendicular to the transverse plane of the mounting clip 300. In some embodiments, the flanges 334a may extend at an angle equal to or between thirty degrees and ninety degrees. In some embodiments, the flanges 334b may extend diagonally away from the second arm 304b generally toward the longitudinal axis 350. In these other embodiments, the flanges 334b may extend away from the second arm 304b and away from the transverse plane of the mounting clip 300. In some embodiments, the flanges 334b may extend at an angle equal to or between thirty degrees and ninety degrees.

The first and second stop components 330a and 330b may further include tool interfaces. For examples, the first and second stop components 330a and 330b may define tool cutouts configured to receive a tool to compress the mounting clip 300.

In some embodiments, in order to facilitate positioning of the mounting clip 300 within mounting clip openings, all or part of an exterior surface of the mounting clip 300 may include a lubricant coating. This lubricant coating may be any type of wet or dry lubricant, including wax, oil, grease, silicon, graphite, etc. In some embodiments, an entire exterior surface of the mounting clip 300 may have the lubricant coating. In other embodiments, only the portions of the mounting clip 300 that contact sides of the mounting holes during installation may include the lubricant coating.

In some embodiments, the mounting clip 300 illustrated in FIGS. 3A-3B may be cheaper to produce compared to the mounting clip 200 illustrated in FIGS. 2A-2B due to use of less material. In addition, in these and other embodiments, the mounting clip 300 illustrated in FIGS. 3A-3B may provide more fine-tuned spring force compared to the mounting clip 200.

Figure 4A:
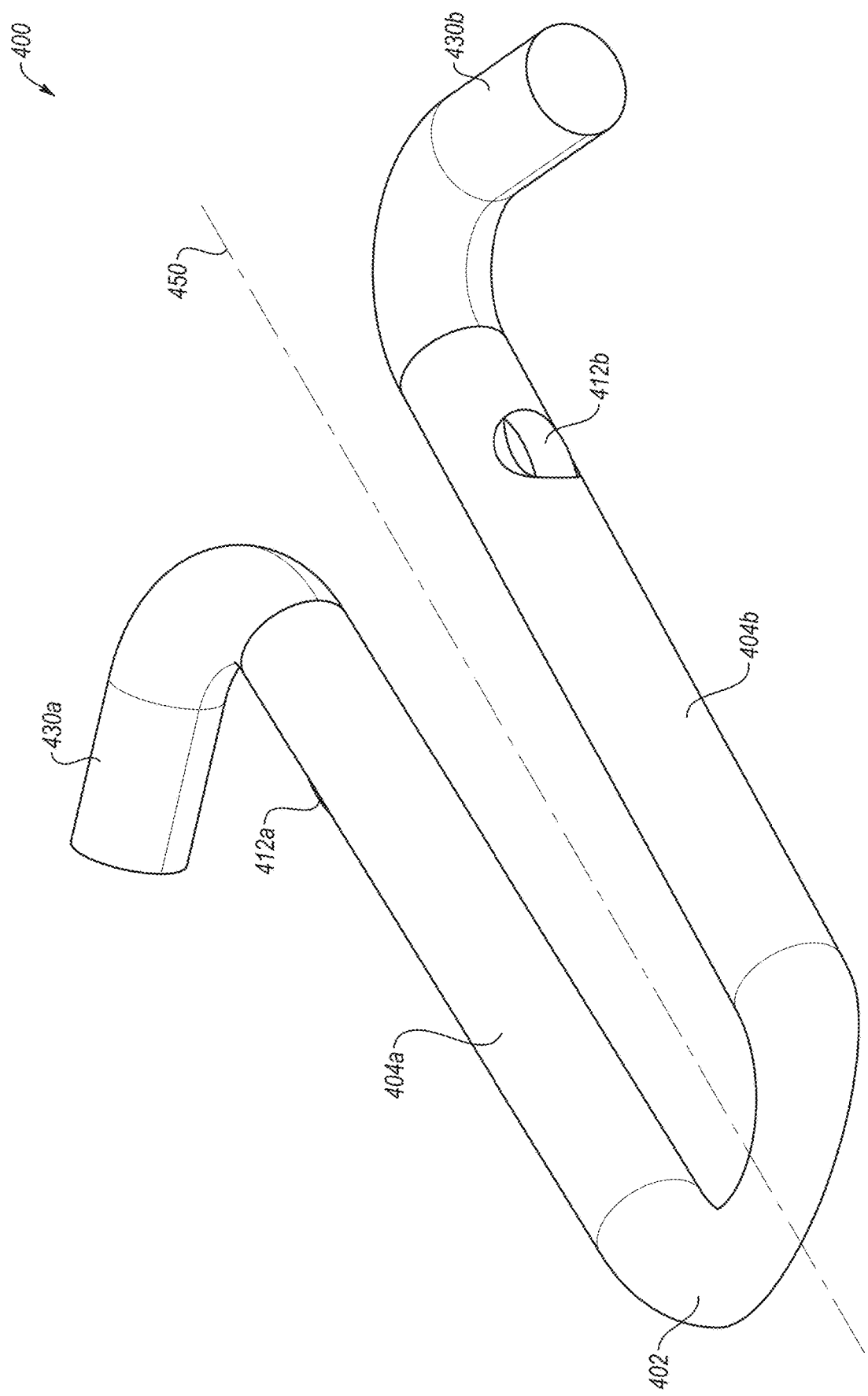
FIGS. 4A-4C illustrate a third exemplary mounting pin.
Figure 4B:
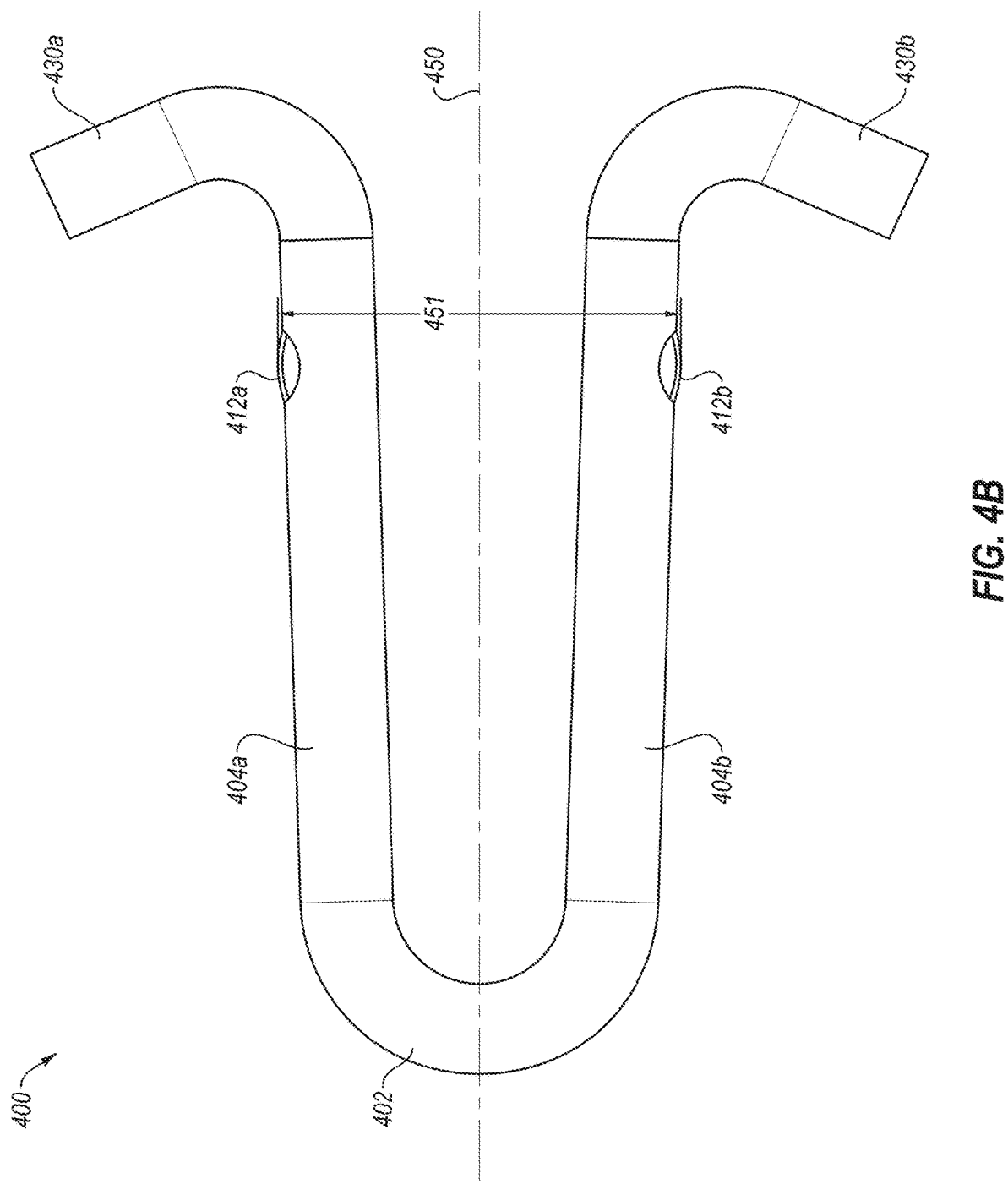
Figure 4C:
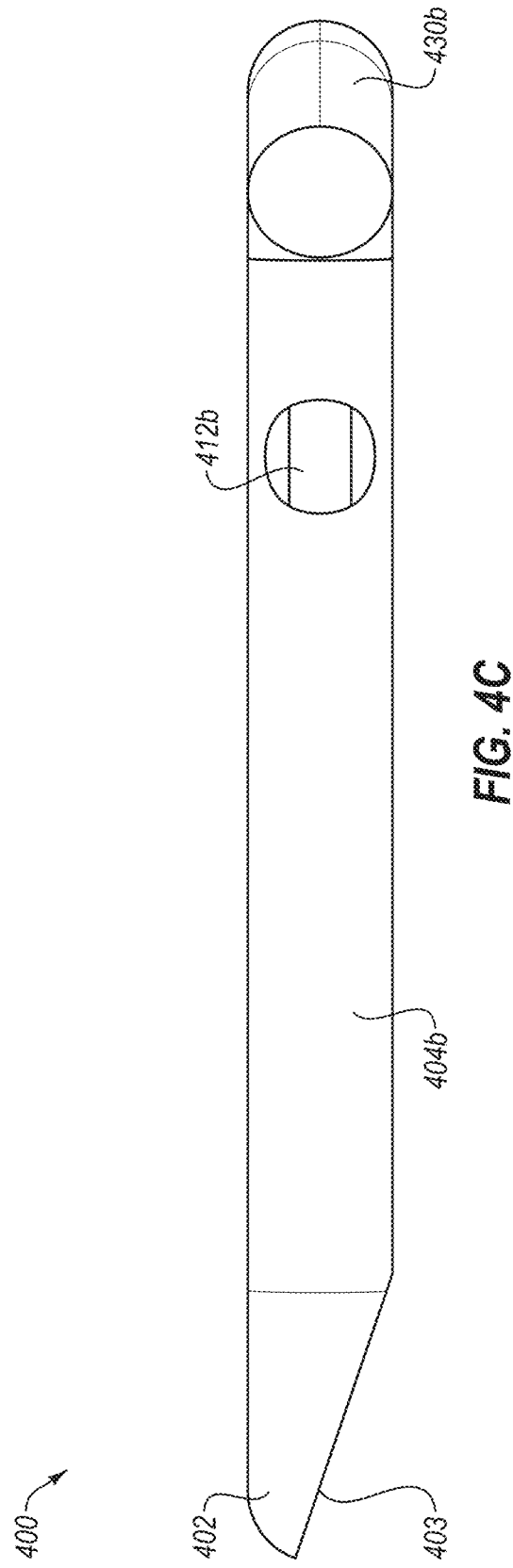

FIGS. 4A-4C illustrate another mounting pin that may be implemented in the PV module mounting system 100 of FIG. 1. Specifically, the mounting pin illustrated in FIGS. 4A-4C is a mounting clip 400. Different views of the mounting clip 400 are provided in FIGS. 4A-4C. For example, FIG. 4A illustrates a perspective view of the mounting clip 400, FIG. 4B illustrates a top view of the mounting clip 400, and FIG. 4C illustrates a side view of the mounting clip 400.

The mounting clip 400 includes a connecting component 402, a first arm 404a, and a second arm 404b. The connecting component 402 is connected to the first arm 404a and the second arm 404b. The first arm 404a and the second arm 404b extend from the connecting component 402 in a direction that follows a longitudinal axis 450 of the mounting clip 400.

The first arm 404a includes a first retention component that comprises a first tab 412a. The second arm 404b includes a second retention component that comprises a second tab 412b. The first and second tabs 412a and 412b are protruding features that extends away from the surface of the first and second arms 404a and 404b. The first tab 412a may be positioned proximate to a first stop component 430a. The second tab 412b may be positioned proximate to second stop component 430b. Unlike the retention components 210 and 310 of the mounting clips 200 and 300, the retention components of the mounting clip 400 lack slots. The first and second arms 404a and 404b also lack compression limiting components.

The connecting component 402 may be elastically deformable such that a distance between the first and second arms 404a and 404b may be selectively adjustable by applying a pressure to the first and second arms 404a and 404b. In an uninstalled state, or when the mounting clip 400 is not positioned within a mounting pin opening in a module rail or a mounting pin opening in a mounting bracket, the mounting clip 400 may have a width 451 (shown in FIG. 4B) between first and second tabs 412a and 412b that is greater than a width of one or both of a mounting pin opening in a module rail and a mounting pin opening in a mounting bracket.

During installation, a tool or other item (such as a hand of an installer) may apply a compressive force to the first and second arms 404a and 404b that may cause the first and second arms 404a and 404b to move inwards towards the longitudinal axis 450. The compressive force may cause the connecting component 402 to deform to apply or load a spring force to the first and second arms 404a and 404b. In some embodiments, the compressive force may cause the first and second arms 404a and 404b to move inward towards the longitudinal axis 450 until the compressive force equals the spring force. Applying a compressive force may thus cause the mounting clip 400 to transition from an uninstalled state to a compressed state in which the width 451 of the mounting clip 400 is less than the width 451 in the uninstalled state.

After the mounting clip 400 is inserted into a mounting pin opening in a module rail and a mounting pin opening in a mounting bracket, the compressive force may be released, which may cause the mounting clip 400 to transition to the installed state. In the installed state, the connecting component 402 may apply a spring force to the first and second arms 404a and 404b in directions away from the longitudinal axis 450. The spring force may cause the first and second arms 404a and 404b to move away from the longitudinal axis 450 and engage with one or both of the module rail and the mounting bracket. With this outward spring force, the first and second retention components 410a and 410b may prevent the mounting clip 400 from disengaging from within the clip openings.

To remove or uninstall the mounting clip 400, a compressive force may again be applied to the distal ends of the first and second arms 404a and 404b to cause the first and second arms 404a and 404b to move inwards towards the longitudinal axis 450 to cause the mounting clip 400 to transition to the compressed state. In the compressed state, the mounting clip 400 may be freely removed from mounting clip openings.

In some embodiments, in order to facilitate positioning of the mounting clip 400 within mounting clip openings, all or a portion of the connecting component 402 may have a ramped surface 403. The ramped surface 403 (shown in FIG. 4C) is on one side of the mounting clip 400 and may simplify inserting the mounting clip 400 into one or both of a mounting pin opening in a module rail and a mounting pin opening in a mounting bracket.

Figure 5A:
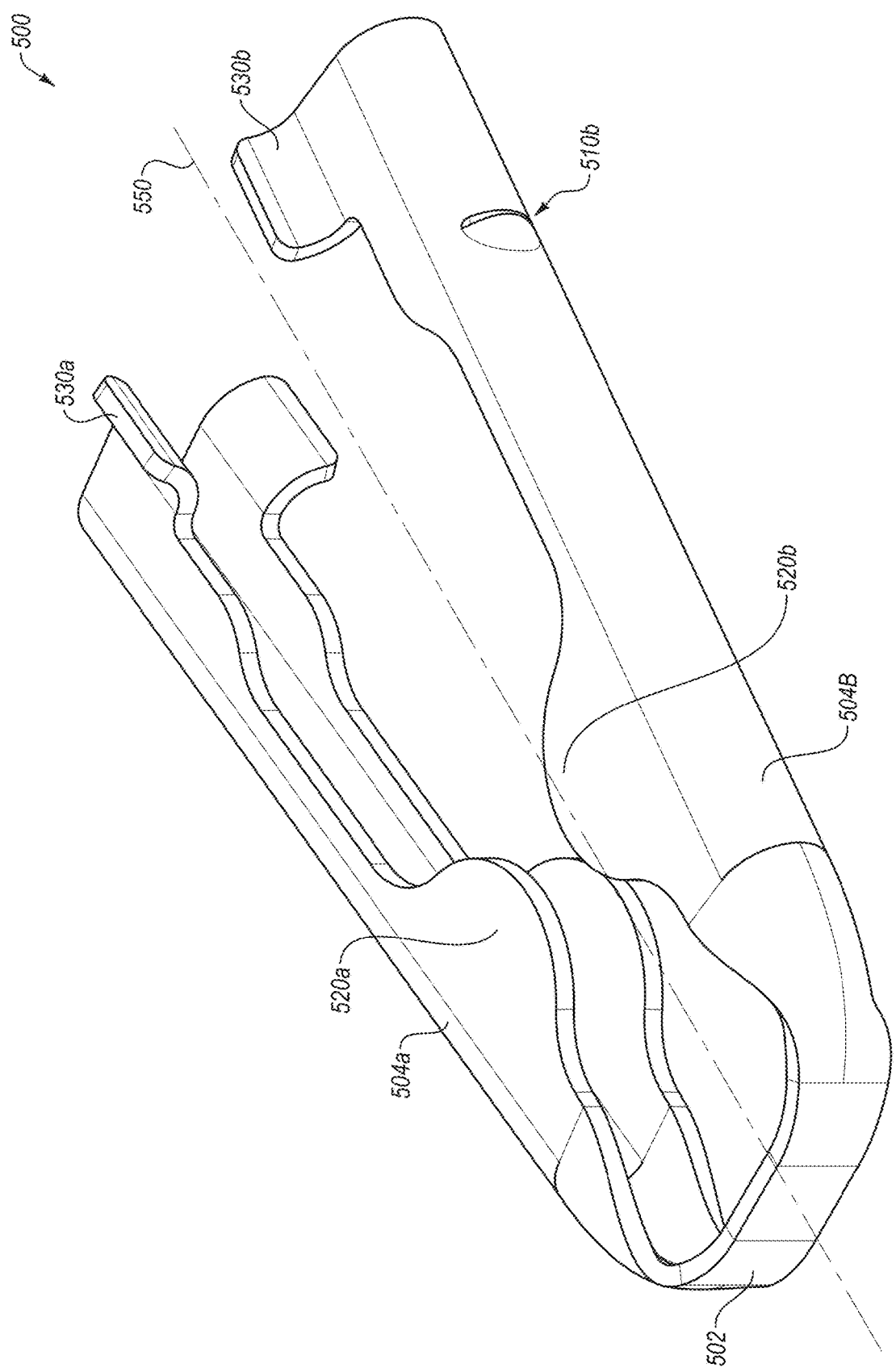
FIGS. 5A-5B illustrate a fourth exemplary mounting pin.
Figure 5B:
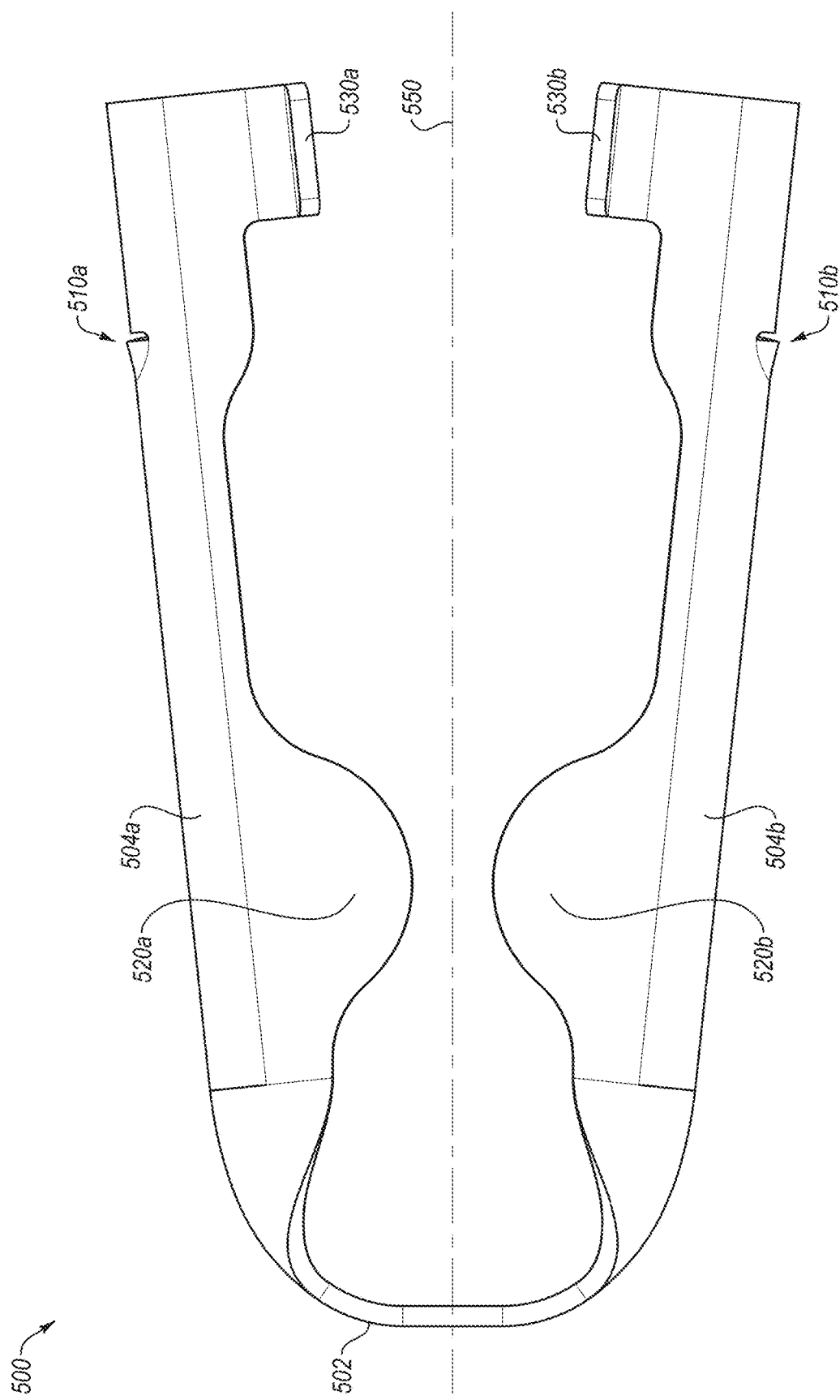

FIGS. 5A-5B illustrate another mounting pin that may be implemented in the PV module mounting system 100 of FIG. 1. Specifically, the mounting pin illustrated in FIGS. 5A-5B is a mounting clip 500. Different views of the mounting clip 500 are provided in FIGS. 5A-5B. For example, FIG. 5A illustrates a perspective view of the mounting clip 500 and FIG. 5B illustrates a top view of the mounting clip 500.

The mounting clip 500 includes a connecting component 502, a first arm 504a, and a second arm 504b. The connecting component 502 is connected to the first arm 504a and the second arm 504b. The first arm 504a and the second arm 504b may extend from the connecting component 502 in a direction that follows a longitudinal axis 550 of the mounting clip 500. The first arm 504a includes a first retention component 510a and the second arm 504b includes a second retention component 510b. The first and second arms 504a and 504b also include first and second compression limiting components 520a and 520b, respectively and first and second stop components 530a and 530b, respectively.

The mounting clip 500 has many of the same features as the mounting clip 300 and performs in a similar manner. For example, the first and second arms 504a and 504b of the mounting clip 500 have a C-shaped cross-sectional profile similar to the mounting clip 300. However, unlike the mounting clip 300, the connecting component 502 has a flat rectangular cross-sectional profile. In addition, the outer surfaces of the first and second arms 504a and 504b are straight and do not curve inward with the first and second compression limiting components 520a and 520b.

Figure 6A:
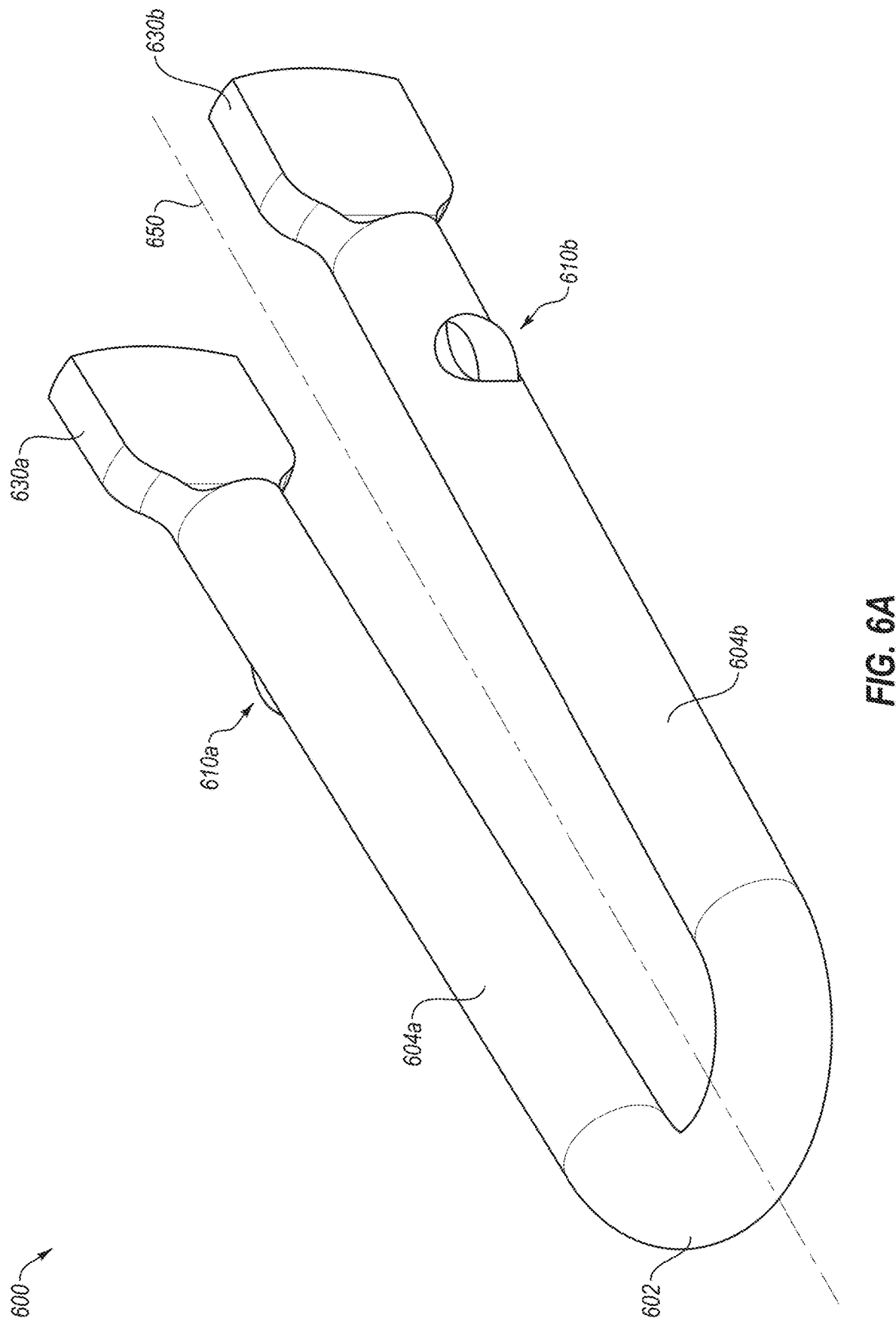
FIGS. 6A-6B illustrate a fifth exemplary mounting pin.
Figure 6B:
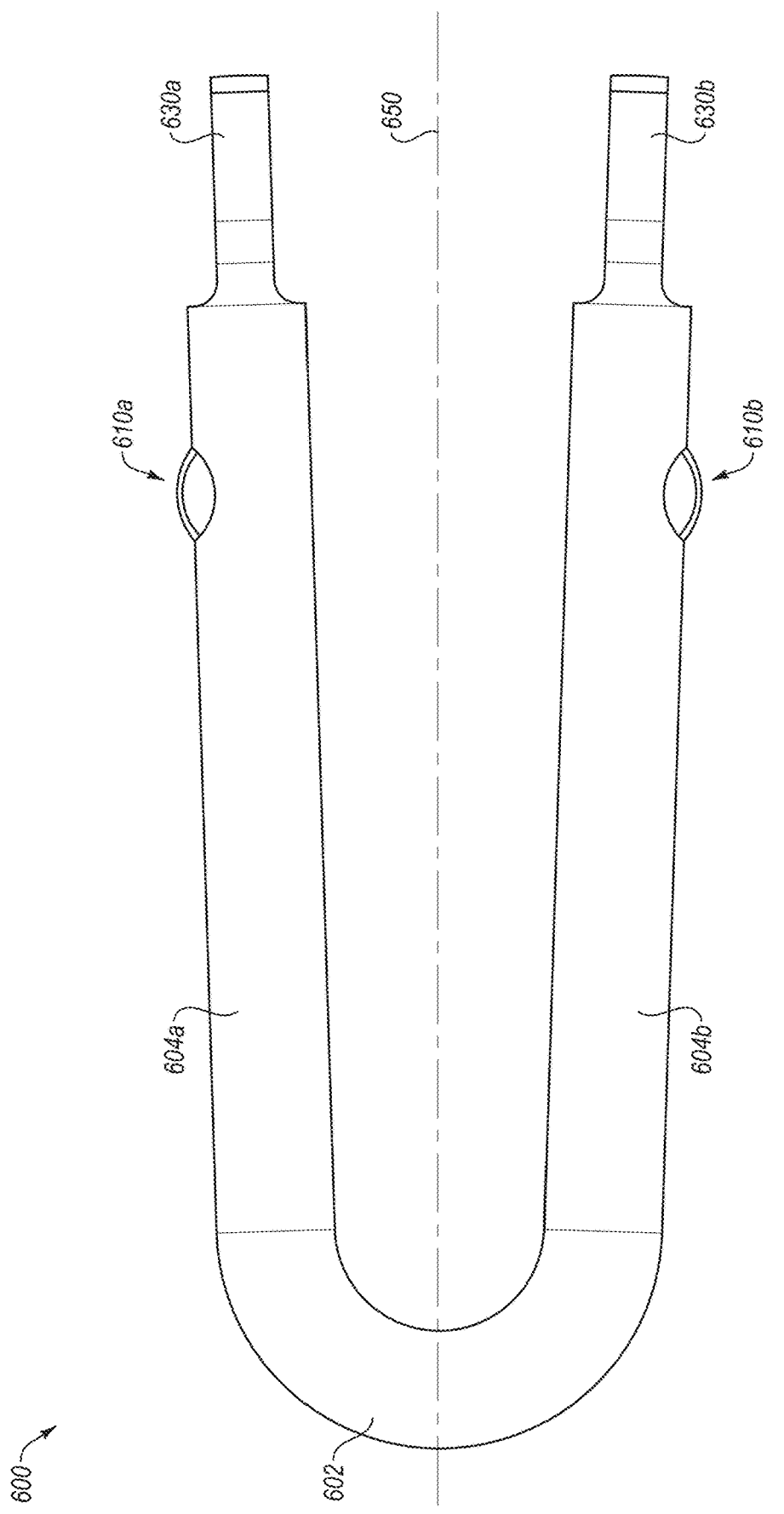

FIGS. 6A-6B illustrate another mounting pin that may be implemented in the PV module mounting system 100 of FIG. 1. Specifically, the mounting pin illustrated in FIGS. 6A-6B is a mounting clip 600. Different views of the mounting clip 600 are provided in FIGS. 6A-6B. For example, FIG. 6A illustrates a perspective view of the mounting clip 600 and FIG. 6B illustrates a top view of the mounting clip 600.

The mounting clip 600 includes a connecting component 602, a first arm 604a, and a second arm 604b. The connecting component 602 is connected to the first arm 604a and the second arm 604b. The first arm 604a and the second arm 604b may extend from the connecting component 602 in a direction that follows a longitudinal axis 650 of the mounting clip 600. The first arm 604a includes a first retention component 610a and the second arm 604b includes a second retention component 610b. The first and second arms 604a and 604b also include first and second stop components 630a and 630b, respectively.

The mounting clip 600 has many of the same features as the mounting clip 200 and performs in a similar manner. For example, the first and second arms 604a and 604b of the mounting clip 600 have a circular cross-sectional profile similar to the mounting clip 200. However, unlike the mounting clip 200, the first and second arms 604a and 604b are straight. The mounting clip 600 lacks compression limiting components and the shape of the first and second stop components 630a and 630b differ from the first and second stop components 230a and 230b of the mounting clip 200.

Figure 7A:
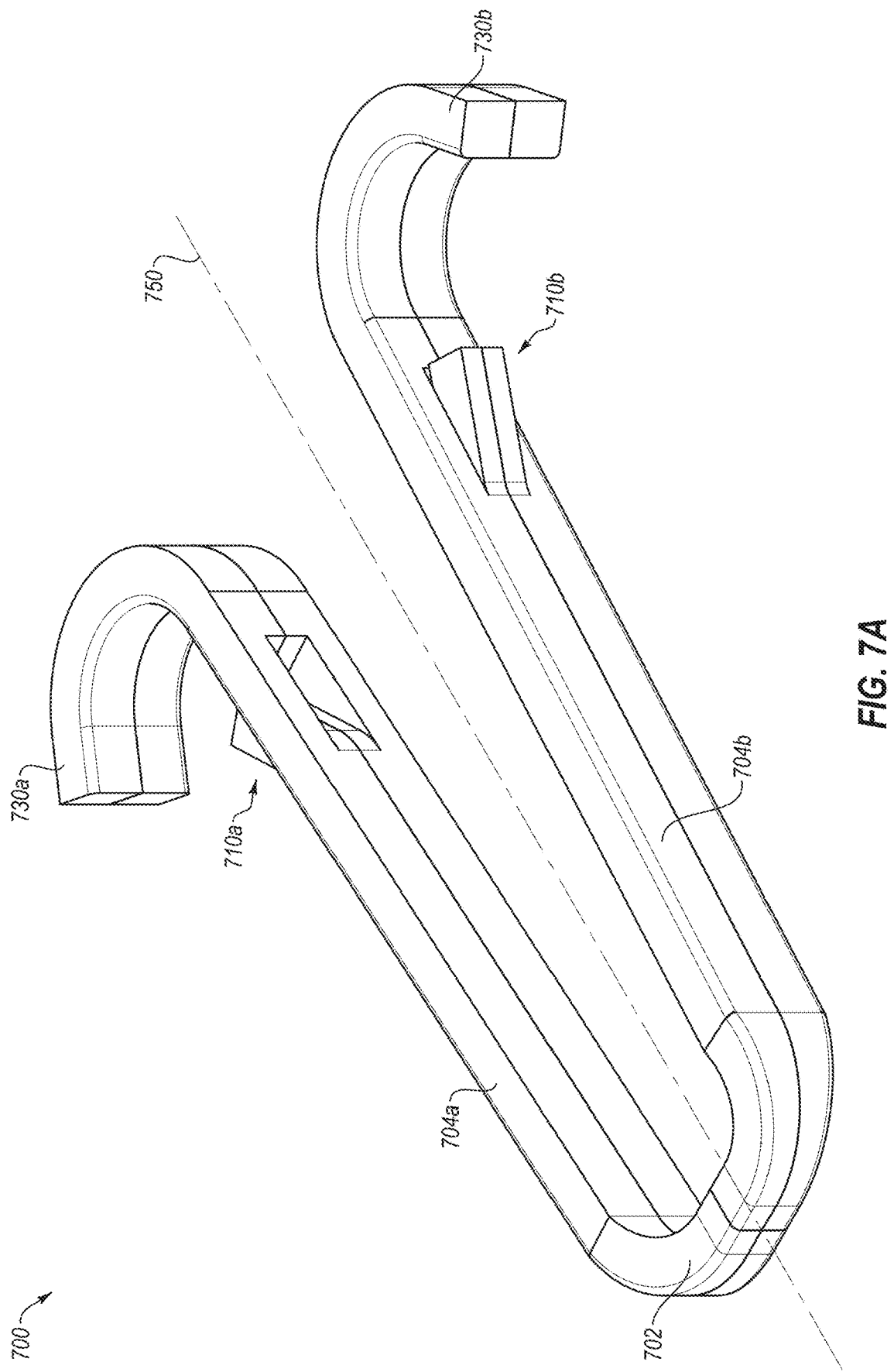
FIGS. 7A-7C illustrate a sixth exemplary mounting pin.
Figure 7B:
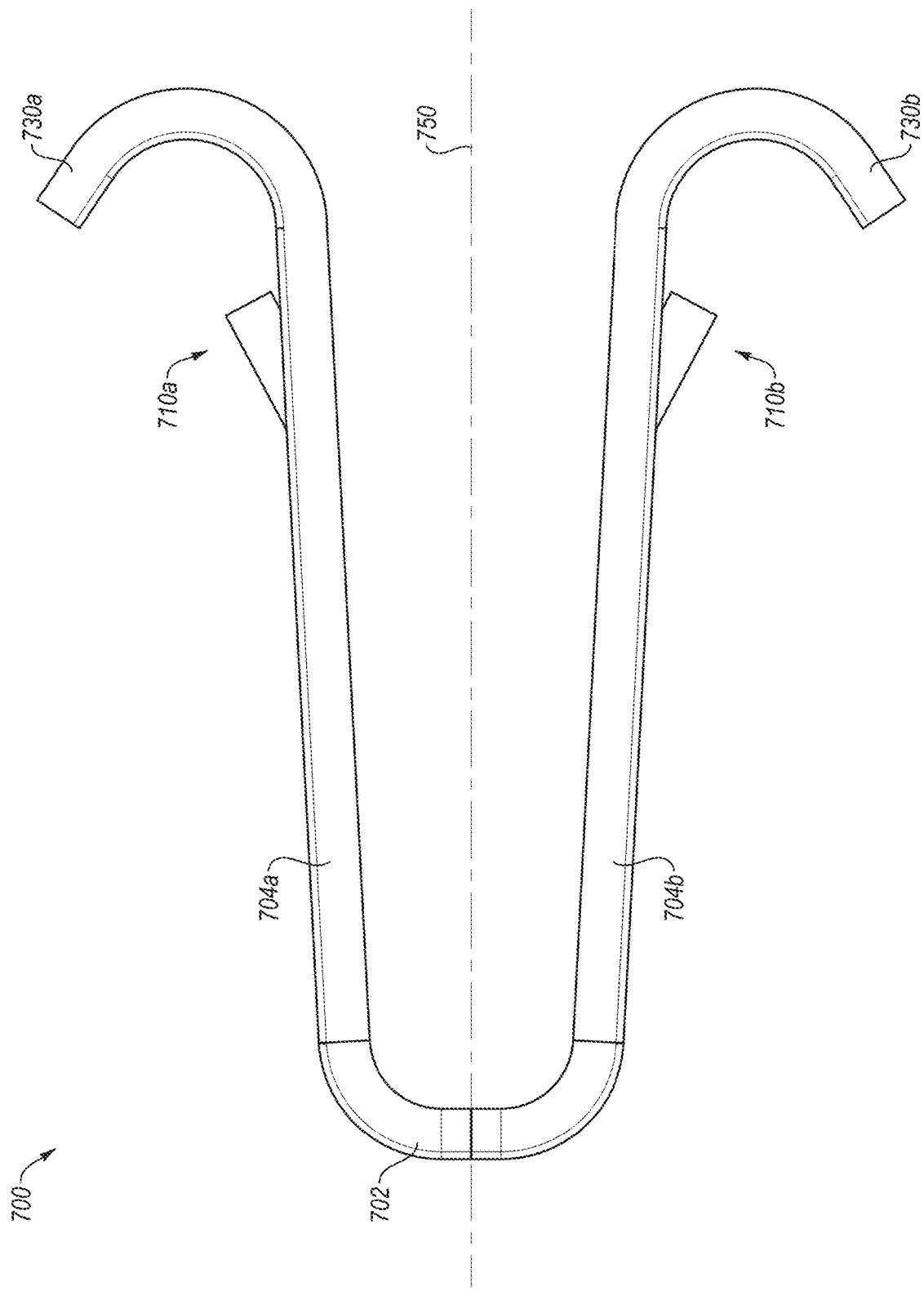
Figure 7C:
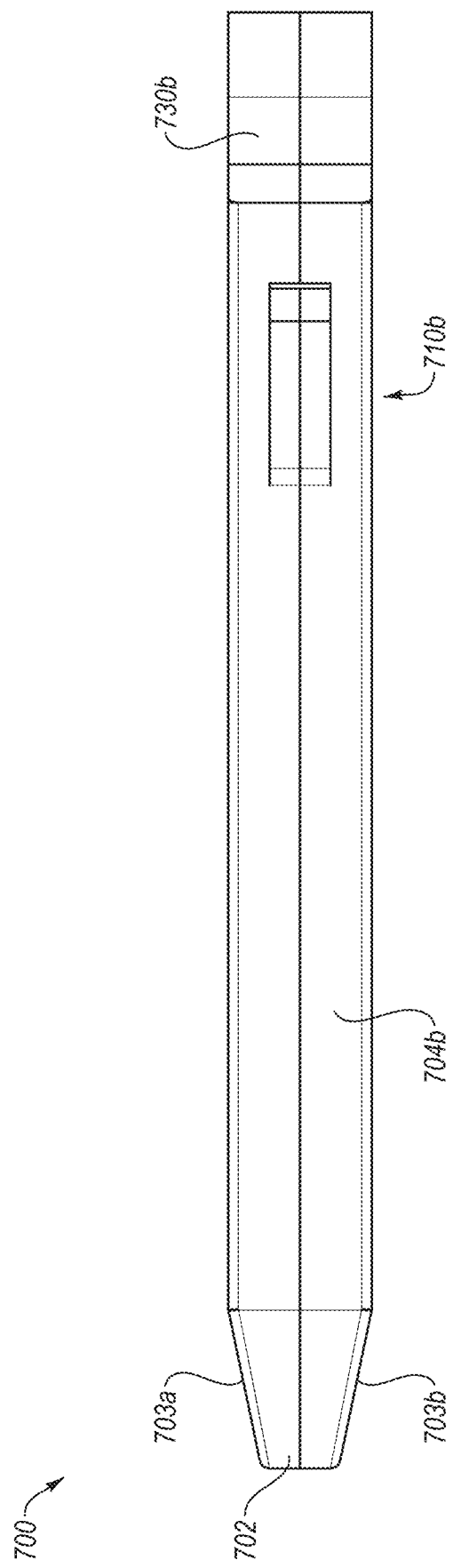

FIGS. 7A-7C illustrate another mounting pin that may be implemented in the PV module mounting system 100 of FIG. 1. Specifically, the mounting pin illustrated in FIGS. 7A-7C is a mounting clip 700. Different views of the mounting clip 700 are provided in FIGS. 7A-7C. For example, FIG. 7A illustrates a perspective view of the mounting clip 700, FIG. 7B illustrates a top view of the mounting clip 700, and FIG. 7C illustrates a side view of the mounting clip 700.

The mounting clip 700 includes a connecting component 702, a first arm 704a, and a second arm 704b. The connecting component 702 is connected to the first arm 704a and the second arm 704b. The first arm 704a and the second arm 704b may extend from the connecting component 702 in a direction that follows a longitudinal axis 750 of the mounting clip 700. The first arm 704a includes a first retention component 710a and the second arm 704b includes a second retention component 710b. The first and second arms 704a and 704b also include first and second stop components 730a and 730b, respectively.

The mounting clip 700 has many of the same features as the mounting clips described previously and it performs in a similar manner. Unlike previously discussed mounting clips, the mounting clip 700 has a rectangular cross-sectional shape and the first and second stop components 730a and 730b hook back in a direction toward the connecting component 702.

In some embodiments, in order to facilitate positioning of the mounting clip 700 within mounting clip openings, all or a portion of the connecting component 702 may have ramped surface s 703a and 703b. The ramped surfaces 703a and 703b (shown in FIG. 4C) are on both sides of the mounting clip 700 and may simplify inserting the mounting clip 700 into one or both of a mounting pin opening in a module rail and a mounting pin opening in a mounting bracket.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A mounting clip for connecting components in a photovoltaic (PV) module mounting system, the mounting clip comprising:
   a first arm having a proximal end and a distal end;
   a second arm having a proximal end and a distal end;
   a connecting component that couples the proximal end of the first arm to the proximal end of the second arm, the connecting component being configured to elastically deform to decrease a distance between the distal end of the first arm and the distal end of the second arm, and apply a spring force to the first arm and the second arm away from a longitudinal axis of the mounting clip when the mounting clip is in a compressed state;
   a first compression limiting component on the first arm and a second compression limiting component on the second arm, wherein:
      the first compression limiting component extends inward from an inner surface of the first arm toward the longitudinal axis of the mounting clip,
      the second compression limiting component extends inward from an inner surface of the second arm toward the longitudinal axis of the mounting clip, and
      the first and second compression limiting components are configured to limit the distance that can be decreased between the distal ends of the first and second arms;
   a first stop component on the first arm and a second stop component on the second arm, wherein:
      the first stop component is positioned toward the distal end of the first arm and extends either upward from a top surface of the first arm or downward from a bottom surface of the first arm,
      the second stop component is positioned toward the distal end of the second arm and extends either upward from a top surface of the second arm or downward from a bottom surface of the second arm, and
      the first and second stop components are configured to limit an insertion depth of the mounting clip into a first clip opening in a mounting bracket and a second clip opening in a module rail; and
   a first retention component on the first arm and a second retention component on the second arm, wherein:
      the first and second retention components are configured to engage with at least one of the module rail or the mounting bracket,
      the spring force applied by the connecting component is configured to cause the first retention component and the second retention component to maintain the engagement with at least one of the module rail or the mounting bracket,
      the first retention component includes a first slot and a first tab that is physically positioned proximate to the first slot, and
      the second retention component includes a second slot and a second tab that is physically positioned proximate to the second slot.

2. The mounting clip of claim 1, wherein:
   a distance between the first retention component and the first stop component is at least as large as a thickness of a sidewall of the module rail or the mounting bracket, and
   a distance between the second retention component and the second stop component is at least as large as the thickness of the sidewall of the module rail or the mounting bracket.

3. The mounting clip of claim 1, wherein:
   the first stop component extends both upward from the top surface of the first arm and downward from the bottom surface of the first arm, and the second stop component extends both upward from the top surface of the second arm and downward from the bottom surface of the second arm.

4. The mounting clip of claim 1, wherein:
the first arm, the second arm, and the connecting component comprise a single unibody piece of material.

5. The mounting clip of claim 1, wherein the connecting component has a rectangular cross sectional profile.

6. The mounting clip of claim 1, wherein:
the first arm has a C-shaped cross sectional profile that defines a channel that opens inward towards the longitudinal axis of the mounting clip and that extends along at least a portion of a length of the first arm, and
the second arm has a C-shaped cross sectional profile that defines a channel that opens inward towards the longitudinal axis of the mounting clip and that extends along at least a portion of a length of the second arm.

7. A mounting clip for connecting components in a photovoltaic (PV) module mounting system, the mounting clip comprising:
a first arm having a proximal end and a distal end;
a second arm having a proximal end and a distal end;
a connecting component that couples the proximal end of the first arm to the proximal end of the second arm, the connecting component being configured to elastically deform to decrease a distance between the distal end of the first arm and the distal end of the second arm, and apply a spring force to the first arm and the second arm away from a longitudinal axis of the mounting clip when the mounting clip is in a compressed state;
a first retention component on the first arm and a second retention component on the second arm, wherein:
the first retention component includes a first tab that extends outward from an outer surface of the first arm away from the longitudinal axis of the mounting clip,
the second retention component includes a second tab that extends outward from an outer surface of the second arm away from the longitudinal axis of the mounting clip, and
the first and second tabs are configured to engage with at least one of a module rail or a mounting bracket;
a first stop component on the first arm and a second stop component on the second arm, wherein:
the first stop component is positioned toward the distal end of the first arm and extends either upward from a top surface of the first arm or downward from a bottom surface of the first arm,
the second stop component is positioned toward the distal end of the second arm and extends either upward from a top surface of the second arm or downward from a bottom surface of the second arm, and
the first and second stop components are configured to limit an insertion depth of the mounting clip into a first clip opening in the mounting bracket and a second clip opening in the module rail; and
a first compression limiting component on the first arm and a second compression limiting component on the second arm, wherein:
the first compression limiting component extends inward from an inner surface of the first arm toward the longitudinal axis of the mounting clip,
the second compression limiting component extends inward from an inner surface of the second arm toward the longitudinal axis of the mounting clip, and
the first and second compression limiting components are configured to limit the distance that can be decreased between the distal ends of the first and second arms.

8. The mounting clip of claim 7, wherein:
the first retention component also includes a first slot, the first tab and the first slot being physically positioned proximate each other, and
the second retention component also includes a second slot, the second tab and the second slot being physically positioned proximate each other.

9. The mounting clip of claim 8, wherein the spring force applied by the connecting component is configured to cause the first and second retention components to maintain the engagement with at least one of the module rail or the mounting bracket.

10. The mounting clip of claim 7, wherein:
the first arm, the second arm, and the connecting component comprise a single unibody piece of material.

11. The mounting clip of claim 7, wherein the connecting component has a rectangular cross sectional profile.

12. The mounting clip of claim 7, wherein:
the first arm has C-shaped cross sectional profiles that defines a channel that opens inward towards the longitudinal axis of the mounting clip and that extends along at least a portion of a length of the first arm, and
the second arm has C-shaped cross sectional profiles that defines a channel that opens inward towards the longitudinal axis of the mounting clip and that extends along at least a portion of a length of the second arm.

* * * * *